United States Patent [19]

Akaboshi et al.

[11] Patent Number: 5,621,908
[45] Date of Patent: Apr. 15, 1997

[54] PARALLEL SORTING SYSTEM TO REDUCE THE AMOUNT OF COMMUNICATION BETWEEN PROCESSING DEVICES

[75] Inventors: Naoki Akaboshi; Yasuo Noguchi; Riichiro Take, all of Kawasaki; Haruo Yokota, Nomi-gun, all of Japan

[73] Assignee: Fujitsu Limited, Kawasaki, Japan

[21] Appl. No.: 502,858

[22] Filed: Jul. 14, 1995

Related U.S. Application Data

[63] Continuation of Ser. No. 139,156, Oct. 21, 1993, abandoned.

[30] Foreign Application Priority Data

Oct. 21, 1992 [JP] Japan ..................... 4-283285

[51] Int. Cl.$^6$ ........................................ G06F 9/30
[52] U.S. Cl. .................. 395/607; 395/800; 364/DIG. 1; 364/DIG. 2
[58] Field of Search .................................. 395/800, 375, 395/650

[56] References Cited

U.S. PATENT DOCUMENTS

| | | | |
|---|---|---|---|
| 4,567,572 | 1/1986 | Morris et al. | 340/146.2 |
| 4,899,334 | 2/1990 | Shimizu | 370/60 |
| 5,084,815 | 1/1992 | Mazzario | 395/800 |
| 5,121,494 | 1/1992 | Dias et al. | 395/600 |
| 5,179,699 | 1/1993 | Iyer et al. | 395/650 |
| 5,216,420 | 6/1993 | Munter | 340/825.99 |
| 5,220,664 | 6/1993 | Lee | 395/600 |
| 5,307,485 | 4/1994 | Bordonaro et al. | 395/600 |
| 5,406,556 | 4/1995 | Widjaja | 370/60 |
| 5,440,553 | 8/1995 | Widjaja | 370/60 |
| 5,475,856 | 12/1995 | Kogge | 395/800 |

OTHER PUBLICATIONS

Bitonic sort on a mesh–connected parallel computer, by Sahni et al. IEEE Jan. 1979, pp. (2–7).

A Parallel Sorting Algorithm on an Eight–Neighbor Processor Array by Takeda et al, IEEE 1992 Publication pp.–456–468.

Sorting in Mesh Connected Multiprocessors by Scherson et al, IEEE 1992 pp.–626–632.

Sorting with Linear Speedup on a Pipelined Hypercube by Doshi et al, 1992 pp. 97–103.

Bitonic sort on a mesh–connected parallel computer, by Sahni et al. IEEE Jan. 1979, pp. (2–7).

Proceedings of the 1991 International Conference on Parallel Processors Aug. 12–16, 1991 by Dr. Wu pp.–I–443–I–450.

An Efficient Multiprocessor Merge Algorithm by Haderle et al IEEE 1990 276–283.

Parallel Sorting of Large Arrays on the MasPar MP–1+ by Smith et al, IEEE 1990 pp. 59–64.

K–Way Bitonic Sort by Nakatani et al, IEEE 1989 pp.–283–288.

*Primary Examiner*—Parshotam S. Lall
*Assistant Examiner*—Zarni Maung
*Attorney, Agent, or Firm*—Staas & Halsey

[57] ABSTRACT

A parallel sorting system is disclosed, having N ($=2^n$) processing devices, each of which comprises a sort element storing unit, an inner sorting unit, a transposing unit, and a comparing and substituting unit. In the sort element storing unit, sort elements/N are stored. Sorting process is performed for n stages. In each stage, the inner sorting unit sorts the sort elements, and the transposing unit exchanges sorted elements at a transposing position with another processing device through a network. Thereafter, the comparing and substituting unit compares the two sets of sorts elements. This process sequence is repeated for all stages. And, after the transposing process and the inner sorting process are performed, the sorting process are completed. In this system, the number of communication times is reduced to 2n.

14 Claims, 19 Drawing Sheets

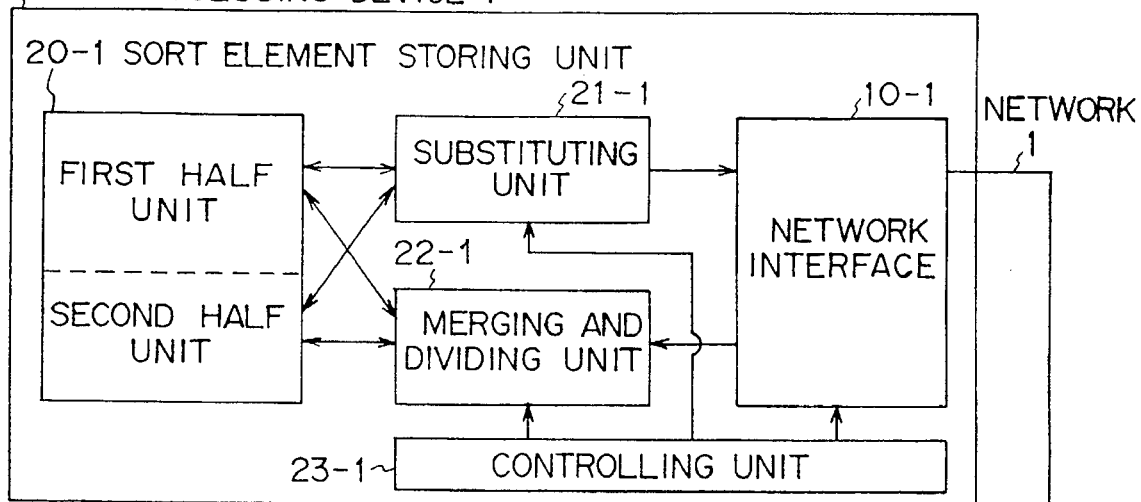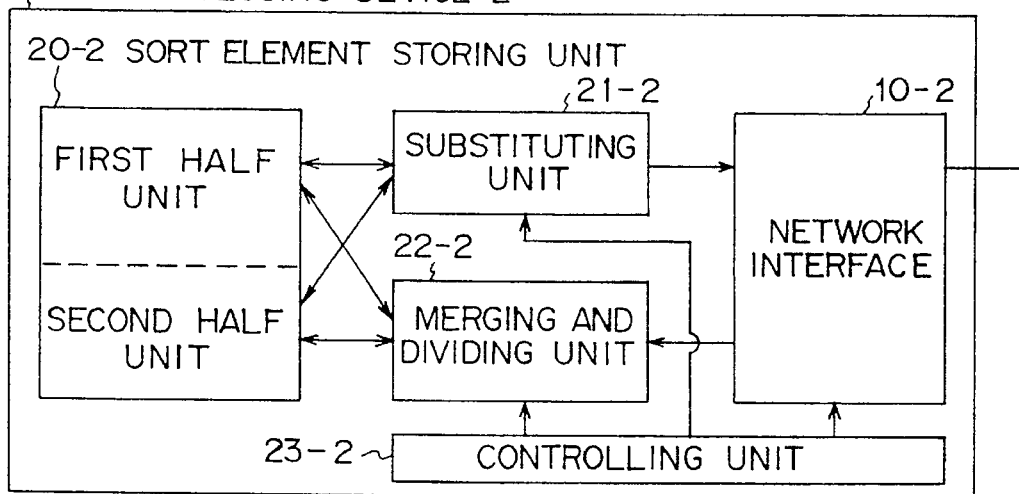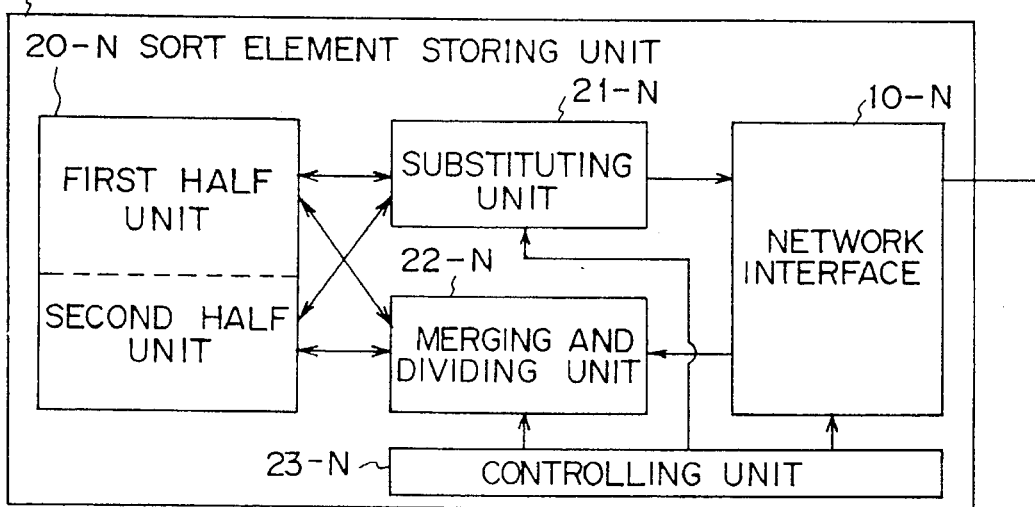
Fig. 8

POINTS 1 TO 15 ARE PROCESSING DEVICES

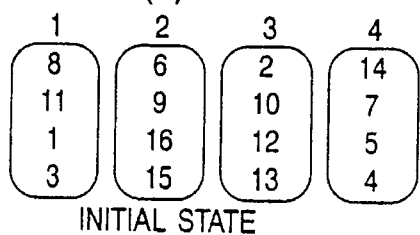
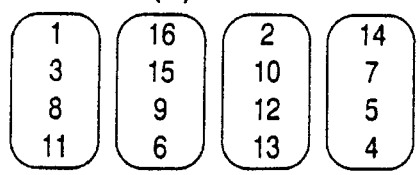
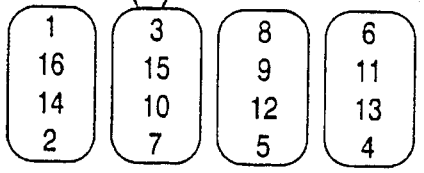
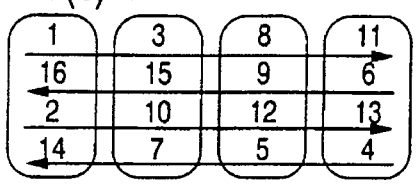
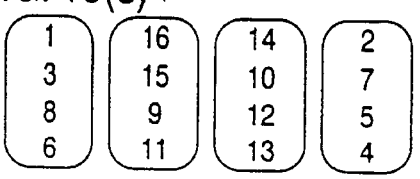
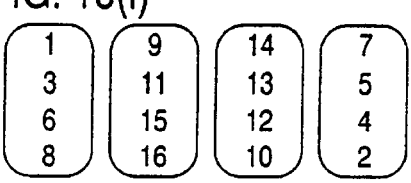
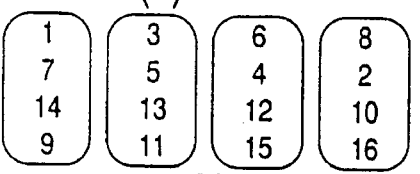
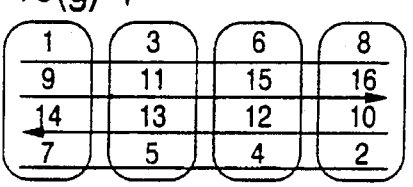
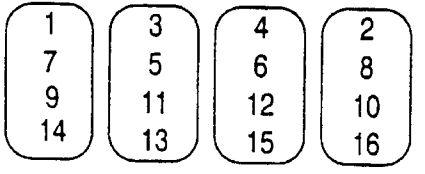
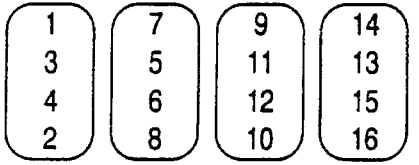
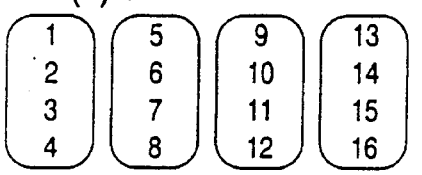

PARALLEL SORTING SYSTEM TO REDUCE THE AMOUNT OF COMMUNICATION BETWEEN PROCESSING DEVICES

This application is a continuation of application Ser. No. 08/139,156, filed Oct. 21, 1993, now abandoned.

BACKGROUND OF THE INVENTION

1. Field of the Invention

The present invention relates to a parallel sorting system having a plurality of processing devices connected in a network for allowing the amount of communication of each processing device to be decreased so as to increase overall throughput.

2. Description of the Related Art

In a parallel sorting system having a plurality of dedicated processing devices in a network, a memory device and a merging device (which receives two sorted vectors and merges them) are connected with an algorithm-specific connection network. By controlling these devices and the connection network, these vectors are repeatedly merged and divided so as to be arranged in smaller-to-larger order or larger-to-smaller order. Thus, the vectors are sorted.

On the other hand, when the parallel sorting process is performed by a parallel computer constructed of a plurality of general-purpose processing devices connected in a network, $2^n$ (where n is a predetermined integer) processing devices and a network are used. Each processing device has a main storage device and a merging device which merges sorted vectors. The network connects the processing devices. Each processing device sorts vectors stored in the main storage device. Next, the processing device substitutes the sorted vectors with those of another processing device. The processing device merges the original vectors with the received vectors. The processing device divides the merged vectors into a first half unit and a second half unit and stores one of them in the main storage device. This process sequence is repeated while the processing devices are changed one after the other. Thus, the vectors stored in the main storage device of each processing device connected in the network are arranged in smaller-to-larger order or larger-to-smaller order. In this manner, the sorting process is performed.

Next, a conventional sorting system will be described. FIG. 1 is a schematic diagram used to explain a conventional sorting system having four processing devices.

In the figure, the four processing devices 0 to 4 store data (2, 6, 10), (1, 7, 8), (4, 5, 11), and (0, 3, 9), respectively. These data are sorted.

In the figure, arrows which connect processing devices each represent both a pair of the processing devices which substitute and merge data and a data storing method for the merged data. In other words, two processing devices which are connected with an arrow represent a pair of processing devices which substitute and merge data. The merged data is divided into two units. The smaller half unit is referred to as the first half unit, whereas the larger half unit is referred to as the second half unit. And the second half unit of data is stored in the processing device pointed at by the arrow.

Data is substituted, merged, and divided between the processing device 0 and the processing device 1. The first half unit of the merged data is stored in the processing device 0, whereas the second half unit of the merged data is stored in the processing device 1. In other words, after the data (2, 6, 10) and the data (1, 7, 8) have been substituted and merged between the processing devices 0 and 1, respectively, the merged data (1, 2, 6, 7, 8, 10) are generated. The data (1, 2, 6, 7, 8, 10) is divided into the first half unit (1, 2, 6) and the second half unit (7, 8, 10). The first half unit (1, 2, 6) is stored in the processing device 0, whereas the second half unit (7, 8, 10) is stored in the processing device 1.

While the substituting, merging, and dividing processes are being performed by the processing devices 0 and 1, a similar process sequence is performed by the processing devices 2 and 3. In other words, the data (4, 5, 11) stored in the processing device 2 and the data (0, 3, 9) stored in the processing device 3 are substituted and merged between the processing devices 2 and 3. Thus, the data (0, 3, 4, 5, 9, 11) is generated. The first half unit (0, 3, 4) is stored in the processing device 3, whereas the second half unit (5, 9, 11) is stored in the processing device 2.

By this process sequence, the substituting, merging, and dividing process for the first stage (stage 0) is completed.

Next, similar substituting, merging, and dividing processes are performed between another pair of processing devices. In other words, this process sequence is performed by a pair of the processing devices 0 and 2 and another pair of the processing devices 1 and 3. Between the processing devices 0 and 2, by the substituting and merging processes, the data (1, 2, 5, 6, 9, 11) is generated. The first half unit (1, 2, 5) is stored in the processing device 0, whereas the second half unit (6, 9, 11) is stored in the processing device 2. On the other hand, between the processing devices 1 and 3, by the substituting and merging processes, the data (0, 3, 4, 7, 8, 10) is generated. The first half unit (0, 3, 4) is stored in the processing device 1, whereas the second half unit (7, 8, 10) is stored in the processing device 3.

Thereafter, similar substituting, merging, and dividing processes are performed between the processing devices 0 and I between the processing devices 2 and 3. Thus, the data (0, 1, 2), the data (3, 4, 5), the data (6, 7 8), and the data (9, 10, 11) are stored in the processing devices 0, 1, 2, and 3, respectively. Thus, the sorting process is completed.

Next, the sorting system will be represented by a general equation. Now assume that the number of processing devices is $N=2^n$ and that processing devices P are denoted by $P_0, P_1, \ldots,$ and $P_{N-1}$. In addition, assume that data V to be sorted is divided into N and then each divided data is stored in each processing device. Moreover, assume that data stored in the processing device $P_i$ is $V_i$.

The processing device $P_i$ independently sorts the data $V_i$ stored therein.

Next, the substituting, merging, and dividing processes are repeated between each processing device in the network. The substituting, merging, and dividing processes are performed log N times. In other words, this process sequence is performed for n stages. The n stages are denoted by $S_0, S_1, \ldots,$ and $S_{n-1}$. Each stage $S_j$ has (j+1) sub stages. The (j+1) sub stages are denoted by $s_{j0}, s_{j1}, \ldots, s_{jj}$.

The substituting, merging, and dividing processes are performed once in each sub stage. In the sub stage $s_{jk}$, the processing device Pi substitutes, for the vector stored therein, the vector stored in the processing device A (i, j, k); merges the vector $V_i$ which has not been substituted with the vector received; and divides the merged vector into a first half unit and a second half unit. In the dividing process, if function B (i, j, k)=0, the processing device $P_i$ stores the first half unit and discards the second half unit. On the other hand, if the function B (i, j, k)=1, the processing device $P_i$ stores the second half unit and discards the first half unit.

The functions A and B are given as follows.

$$A(i, j, k) = i \oplus 2^{j-k} \quad (1)$$

$$B(i, j, k) = i_{j+1} \oplus i_{j-k} \quad (2)$$

where $i_j$ is the value (0 or 1) of $b_j$ of the binary notation of i ($b_{n-1}, b_{n-2}, \ldots b_j, \ldots, b_1, b_0$).

After the process sequence for the sub stage $s_{ij}$ of the stage $S_{n-1}$ has been completed, the sorted vector can be obtained.

In the case of the system having four processing devices, since $N=2^2=4$, the sorting process is completed in two stages.

FIG. 2 is a schematic diagram for explaining the order of process sequence of the stages for eight processing devices. Since the number of the processing devices is eight, $N=2^n=8$, thereby n=3. Thus, the number of stages is three ($S_0, S_1, S_2$). The stage $S_0$ has one sub stage ($s_{00}$). The stage $S_1$ has two sub stages ($s_{10}$ and $s_{11}$). The stage $S_2$ has three sub stages ($s_{20}, s_{21}$, and $s_{22}$). The pair of processing devices which perform the substituting, merging, and dividing processes and the arrow direction (which represents which of first half unit or second half unit to be stored) for each sub stage depend on the above equations (1) and (2).

FIG. 3 is a schematic diagram used to explain a process sequence performed in each sub stage of a conventional system.

With reference to FIG. 3, the process sequence performed in each sub stage will be described. Now assume that the substituting, merging, and dividing processes are performed between processing devices X and Y in a particular sub stage.

Each processing device has a buffer which stores a vector. For example, in the stage 1, in the system having four processing devices shown in FIG. 1, the buffer of the processing device 0 stores a vector (2, 6, 10), whereas the buffer of the processing device 1 stores a vector (1, 7, 8).

First, vectors which are stored in two processing devices X and Y are substituted with each other. In the example shown in FIG. 1, the processing device sends the vector (2, 6, 10) to the processing device 1. On the other hand, the processing device 1 sends the vector (1, 7, 8) to the processing device 0. The processing devices 0 and 1 each store the received vector in another buffer thereof.

Thereafter, the processing devices 0 and 1 each merge the two vectors stored in the two buffers thereof. Thus, in the processing devices X and Y, the two vectors stored in the buffers are sorted. In the example shown in FIG. 1, after the two vectors have been merged, a vector (1, 2, 6, 7, 8, 10) is generated. Thereafter, depending on the arrow direction determined by the equation (2), either the first half unit or the second half unit of the merged vector is stored. When the arrow orients from the processing device X to the processing device Y, the first half unit is stored in the processing device X, whereas the second half unit is stored in the processing devices Y. In FIG. 1, the first half unit (1, 2, 6) is stored in the buffer of the processing device 0, whereas the second half unit (7, 8, 10) is stored in the buffer of the processing device 1. Thus, the substituting, merging, and dividing processes for one sub stage are completed.

As described above, in the conventional system, by repeating this process sequence (namely, the substituting, merging, and dividing processes) between two of a plurality of processing devices, vectors stored in all the processing devices are sorted.

FIG. 4 is a schematic diagram used to explain a conventional system.

As shown in the figure, two of a plurality of processing devices connected in a network are designated as a pair. Between such a pair of processing devices, vectors stored therein are substituted. Each processing device then merges a vector stored therein and another vector received from the other processing device, and divides the merged vector into the first and second half units. Thereafter, between another pair of two processing devices, the substituting, merging, and dividing processes are performed. By repeating this process sequence for all the processing devices, all the vectors are sorted.

However, the conventional system has the following problems.

First, the system which uses processing devices connected in a sorting-dedicated network is not practical. Specifically, in most applications, the sorting process is not used independently. Rather, the sorting process is used for arranging the results of other processes or as a pre-process thereof. Thus, it is not practical to construct a connection network dedicated to the sorting process.

In addition, in the conventional sorting system using a general-purpose connection network, the amount of communication performed between two processing devices for the vector substituting process is large, resulting in an increase of the load of the communicating process.

In other words, in the conventional system, when the number of processing devices is $N=2^n$, the number of stages is n and the number of sub stages is also n since each sub stage requires a communicating process. The sorting process for all the stages requires the communicating process (1+2+ ... +n) times (namely, n (n +1)/2 times). Thus, the number of times communicating process is required is given by the following equation.

$$M = \log N (\log N + 1)/2,$$

where M denotes the number of times the communicating process is required. The amount of communication is expressed by multiplying M by the number of elements of the vectors.

When N=4, the number of times the communicating process is required is 3 (M=3). When N=8, m=6. Thus, as the number of the processing devices increases, the value of M further increases. In other words, when $N=256=2^8$, m=36. When $N=1024=2^{10}$, M=55. In the conventional system, the communicating process requires a large amount of the resources of the system.

In the conventional sorting system used in the general-purpose connection network, since all the vectors which have been sorted are substituted between each processing device and then the substituted vectors are merged, the same merging process is redundantly performed in two processing devices.

Thus, the present invention seeks to overcome the above-described problems of conventional sorting systems.

SUMMARY OF THE INVENTION

An object of the present invention is to provide a parallel sorting system having a plurality of processing devices each of which performs an inner process, the plurality of devices being connected in a general-purpose connection network so as to reduce the required amount of communication, thereby improving the throughput of the sorting process.

In accordance with a first embodiment of the present invention, N ($=2^n$) processing devices, which are connected in a network, are used. Each processing device comprises a sort element storing unit, an inner sorting unit, a transposing unit, a comparing and substituting unit, and a controlling unit.

The sort element storing unit stores elements where the number of sort elements have been divided into N, the number of processing devices. The inner sorting unit sorts elements stored in the sort element storing unit in smaller-to-larger order or larger-to-smaller order and stores the sorted elements in the sort element storing unit.

The transposing unit exchanges the sort elements stored in the sort element storing unit with those stored in another processing device through the network, sends the sorted elements to a transposing position of the sort element storing unit of the other processing device, and stores sorted elements received from the other processing device at the transposing position of the sort element storing unit.

The comparing and substituting unit compares two sets of sort elements stored in the sort element storing unit and substitutes them for each other, if necessary.

The controlling unit controls the process sequence of the inner sorting unit, the transposing unit, and the comparing and substituting unit. In addition, the controlling unit controls the sorting sequence of the inner sorting unit. Moreover, the controlling unit controls the selection of the comparison pair of processing devices and the substituting method processed by the comparing unit.

According to the present invention, in contrast to a conventional system the substituting and merging processes for sort elements are performed internally by the comparing and substituting unit in each processing device rather than in a network. Thus, the amount of communication between processing devices can be reduced. The inner processes performed by the comparing and substituting unit are performed by the transposing unit and the inner sorting unit of each processing device.

The present invention may be accomplished in accordance with a second embodiment of the present invention. As with the above-described first embodiment, in the second embodiment, N ($=2^n$) processing devices, which are connected in a network, are used. Each processing device comprises a network interface unit, a sort element storing unit, a substituting unit, a merging and dividing unit, and a controlling unit. The network interface unit interfaces with the network.

The sort element storing unit stores elements where all sort elements have been divided into N.

The substituting unit sends a first half unit (which is a smaller set) or a second half unit (which is a larger set) of the sorted elements stored in the sort element storing unit to another processing device through the network interface unit.

The merging and dividing unit merges the sort elements received from the other processing device, through the network interface unit, and the sort elements of the second half unit or the first half unit which have not been sent to the other processing device; sorts the merged elements; divides them into a first half unit (smaller unit) and a second half unit (larger unit); and stores these units in the sort element storing unit.

The controlling unit controls the substituting unit, the merging and dividing unit, and the network interface unit. The controlling unit controls the process sequence of the entire system. In addition, the controlling unit causes the substituting unit to send an appropriate one of the first half unit or the second half unit of the sort elements to an appropriate processing device. Moreover, the controlling unit controls the substituting unit and the network interface unit.

According to the second embodiment of the present invention, in the substituting and merging process, only smaller sort elements (first half unit) or larger sort elements (second half unit) which have been sorted and stored in the sort element storing unit are substituted with those of the other processing device through the network. Thus, the amount of communication can be reduced.

According to the first and second embodiments of the present invention, the amount of communication between each processing device through the network can be reduced. Thus, the throughput of the entire system can be improved.

These and other objects, features and advantages of the present invention will become more apparent in light of the following detailed description of a best mode of embodiment thereof, as illustrated in the accompanying drawings.

BRIEF DESCRIPTION OF DRAWINGS

FIG. 8 is a block diagram used to explain the principle of a sorting system in accordance with the present invention;

FIG. 13 is a schematic diagram used to explain a system having four processing devices which sort 16 numeric values;

DESCRIPTION OF THE PREFERRED EMBODIMENTS

Theory of Operation

Figure 1:
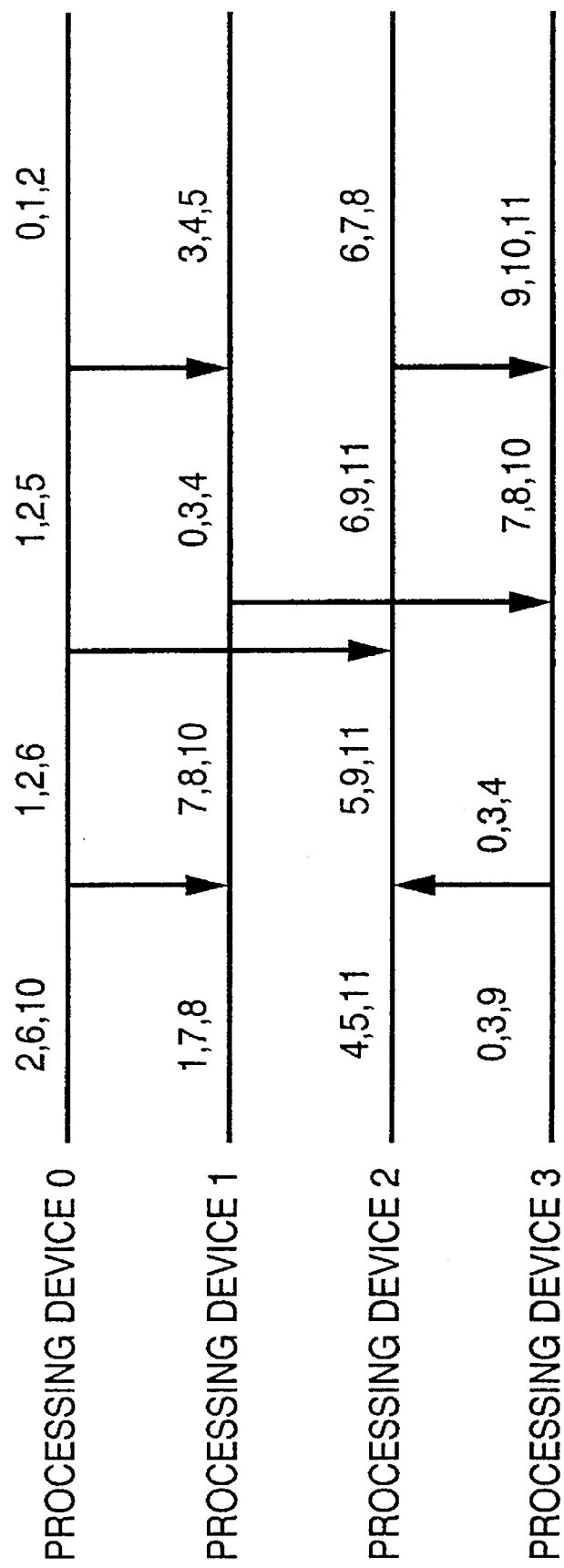
FIG. 1 is a schematic diagram used to explain a conventional sorting system having four processing devices.
Figure 2:
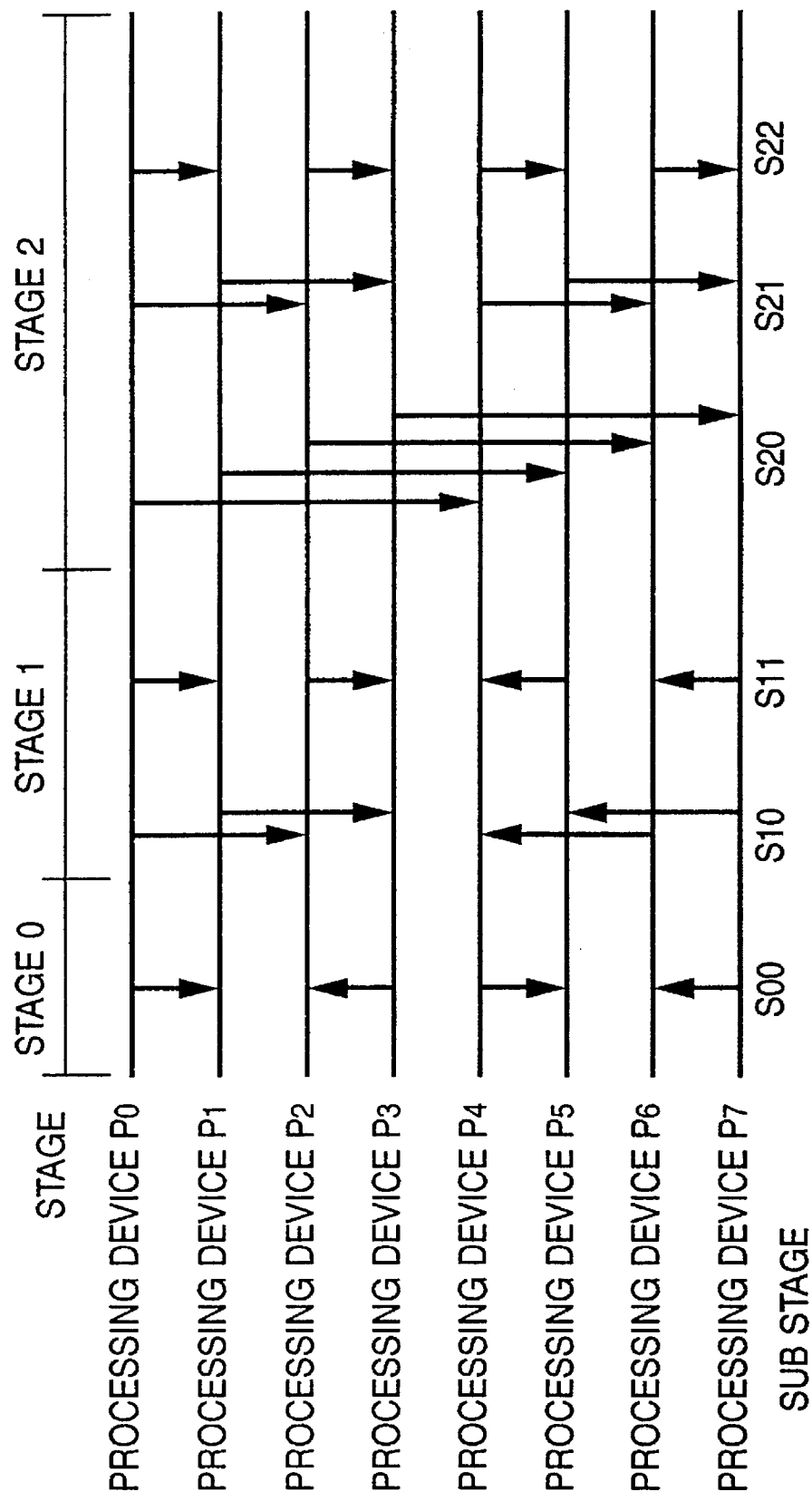
FIG. 2 is a schematic diagram used to explain a stage of a conventional sorting system having eight processing devices.
Figure 3:
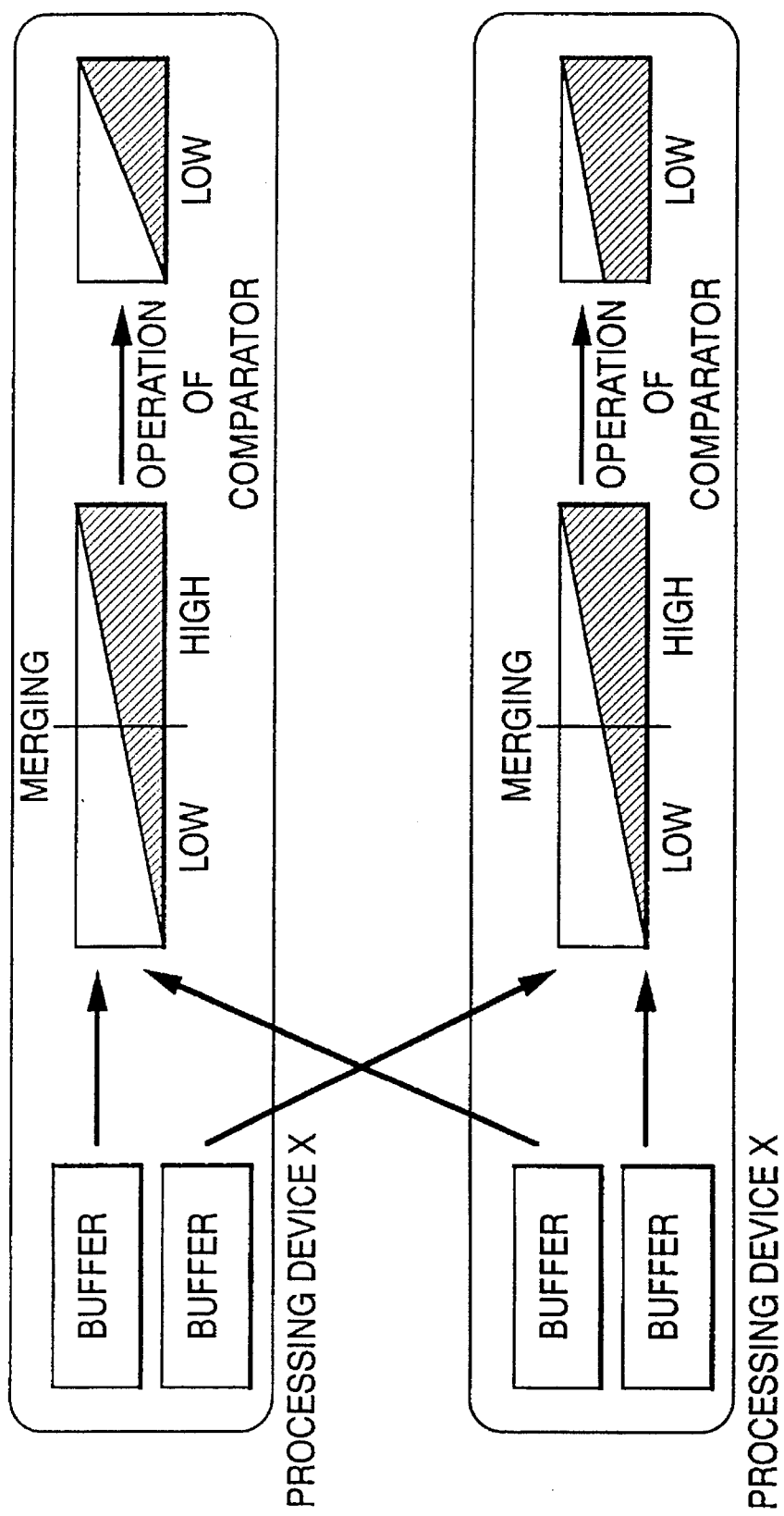
FIG. 3 is a schematic diagram used to explain a process sequence performed in a sub stage of the conventional system.
Figure 4:
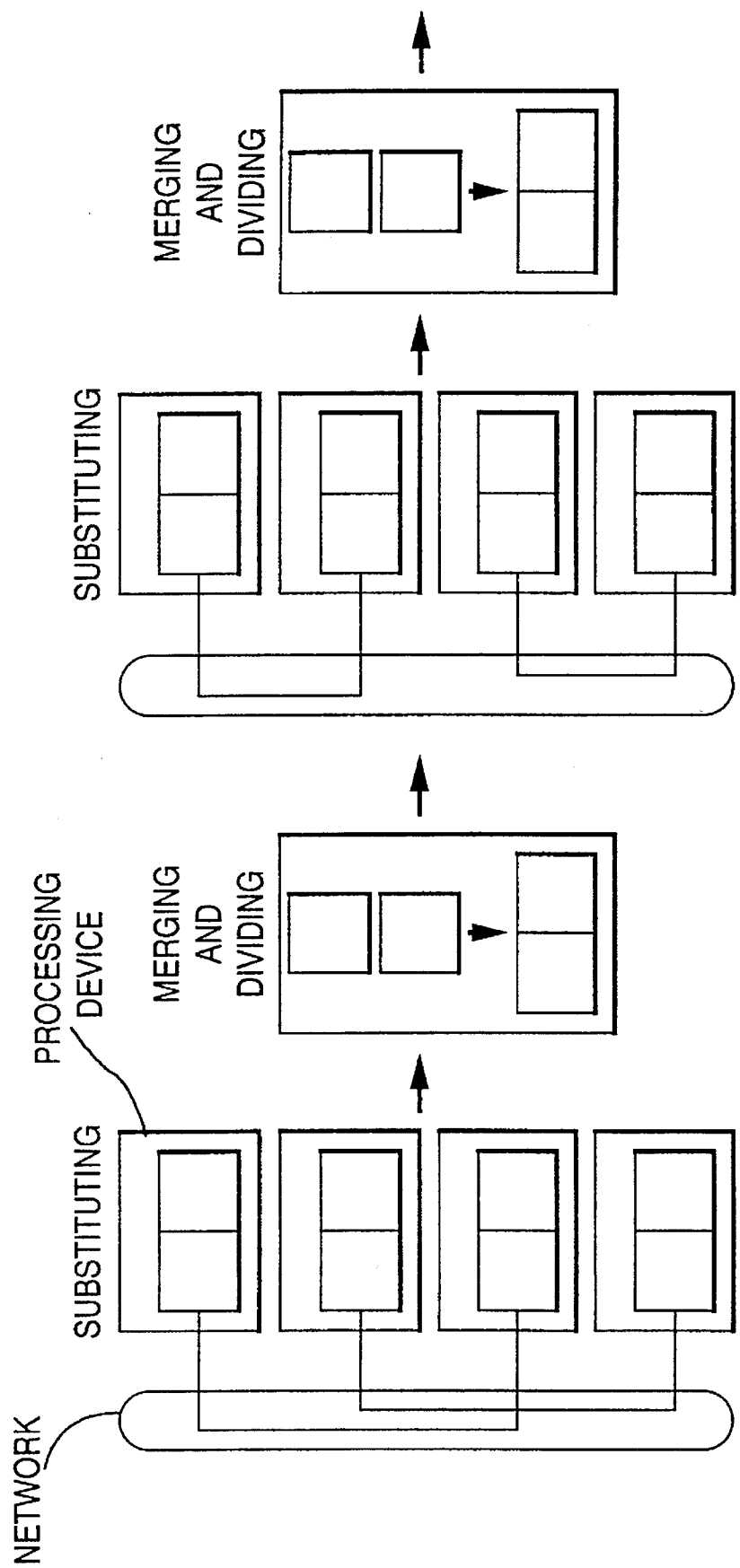
FIG. 4 is a schematic diagram used to explain the conventional sorting system.
Figure 5:
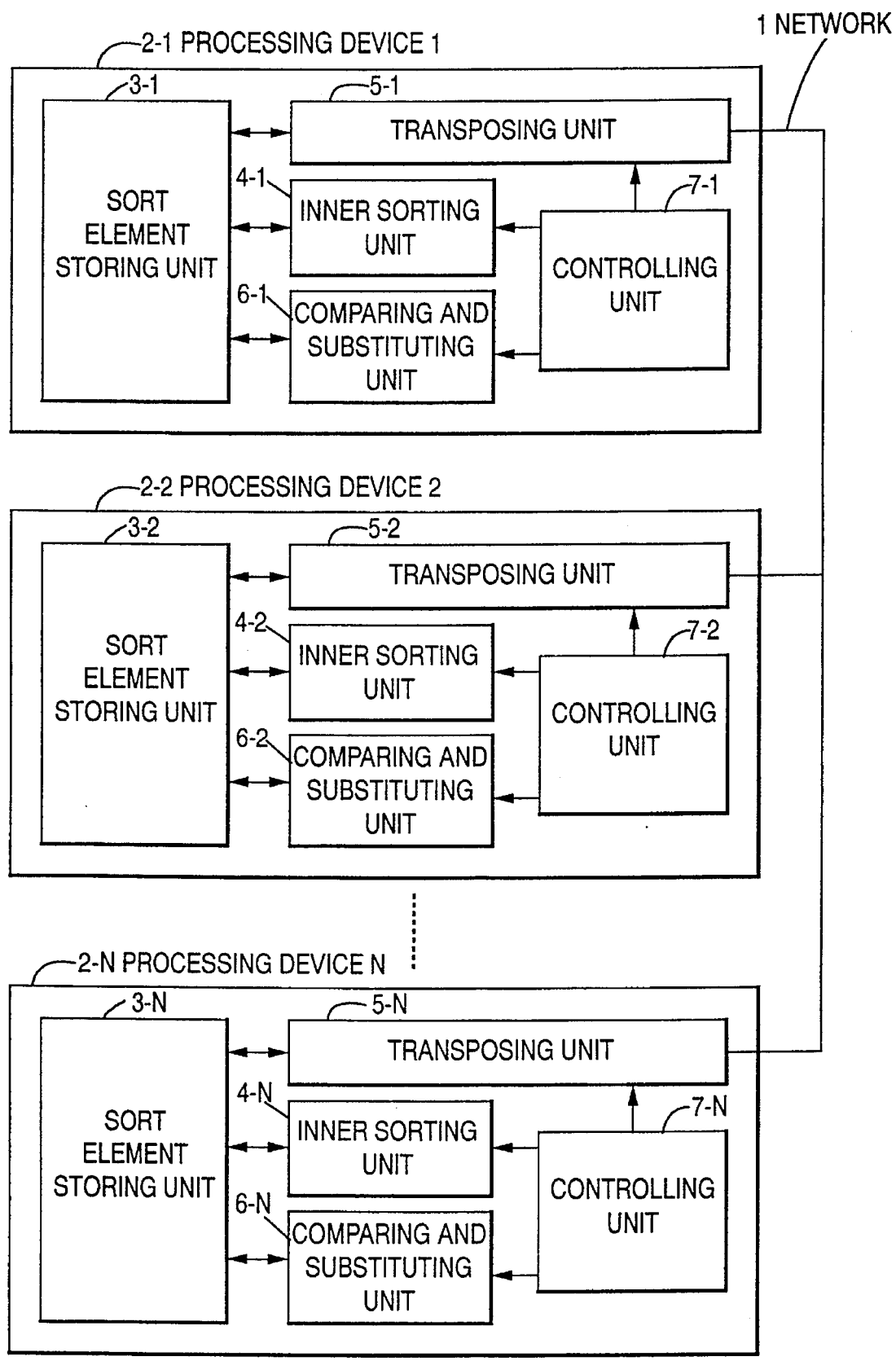
FIG. 5 is a block diagram showing to a first principle of operation of the present invention.

First, the principles of operation of the present invention will be described below with respect to FIGS. 5-9. FIG. 5 is a block diagram showing an example of the parallel sorting system used to explain the principles of the present invention. In the present invention, N ($=2^n$) processing devices 2 (2-1, 2-2, ..., and 2-N) are connected in a network 1.

In the following description, one processing device is explained, and is denoted by reference number 2. The units with which each processing device is provided, e.g., as seen in processing device 2-1, are similarly denoted, i.e., 3-1, 4-1, 5-1, and so forth.

The processing device 2 comprises a sort element storing unit 3, an inner sorting unit 4, a transposing unit 5, a comparing and substituting unit 6, and a controlling unit 7.

The sort element storing unit 3 stores elements where the number of sort elements have been divided by N.

The inner sorting unit 4 sorts sort elements stored in the sort element storing unit 3 in smaller-to-larger order or larger-to-smaller order and then stores the sorted elements in the sort element storing unit 3.

The transposing unit 5 sends the sort elements stored in the sort element storing unit 3 to a transposing position of another processing device 2 through the network 1. In addition, the transposing unit 5 receives sort elements from the other processing devices 2 and stores them at a transposing position.

The comparing and substituting unit 6 compares the two sets of sort elements stored in the sort element storing unit 3 and substitutes them for each other if necessary.

The controlling unit 7 controls the process sequence of the inner sorting unit 4, the transposing unit 5, and the comparing and substituting unit 6. In addition, the controlling unit 7 controls the sorting order of the inner sorting unit 4. Moreover, the controlling unit 7 controls the selection of the comparison pair of processing devices and the substituting method processed by the comparing and substituting unit and the substituting system.

Next, the operation of the system shown in FIG. 5 present will be described.

Assume that sort elements are sorted in parallel by N ($=2^n$) processing devices 2 (2-1, 2-2, ..., and 2-N) which are connected by a network I as a general purpose connection network. The sort elements, which are divided into N, the number of processing devices, are stored in sort element storing units 3-1, 3-2, ..., and 3-N, respectively.

Figure 6A:
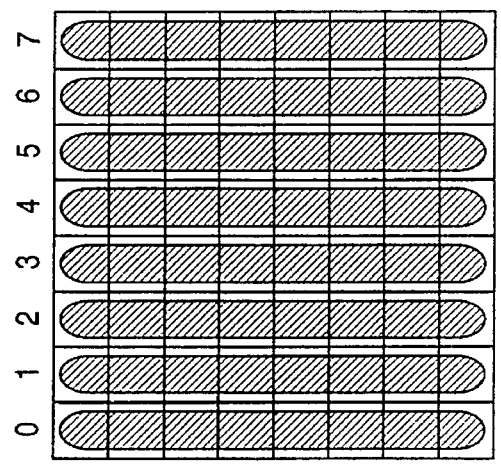
FIG. 6A is a schematic diagram used to explain assignment of sort elements to a processing device.

FIG. 6A is a schematic diagram used to explain the assignment of sort elements to a processing device 2.

When the total number of sort elements is D, the D elements are divided into N. Each processing device 2 stores (D/N) elements. The FIG. 6A shows the sort element storing unit 3 of a processing device 2 in the case where the number of processing devices is eight (namely, N=8). In this case, assume that the eight sort element storing units 3 (3-0, 3-1, ..., and 3-7) each have eight storing regions.

For example, when the number of sort elements is 64 (namely, D=64), each processing device 2 stores eight sort elements (64/8). Each storing region stores one element. On the other hand, when the number of sort elements is 32 (namely, D =32), each processing device 2 stores four sort elements (32/8). Thus, four of eight storing regions of each processing device each store a sort element. Each of the remaining four storing regions is filled with a particular value which does not affect the sorting process. This value is for example '0'. When the number of sort elements is 128 (namely, D=128), each processing device 2 stores 16 sort elements (128/8). In this case, the eight storing regions of each processing device each store a vector consisting of two numeric values.

As with the conventional system, in this construction of the present invention, the sorting process is performed in n stages ($S_0$, $S_1$, ..., and $S_{n-1}$). In addition, each stage $S_j$ consists of (j+1) sub stages ($s_{j0}$, $s_{j1}$, ..., and $s_{jj}$).

The sorting process starts with the 0-th stage $S_0$.

Each controlling unit 7 activates the inner sorting unit 4. The inner sorting unit 4 sorts elements stored in the sort element storing unit 3 under the control of the controlling unit 7. Thereafter, the inner sorting unit 4 stores the sorted elements in the sort element storing unit 3.

Figure 6B:
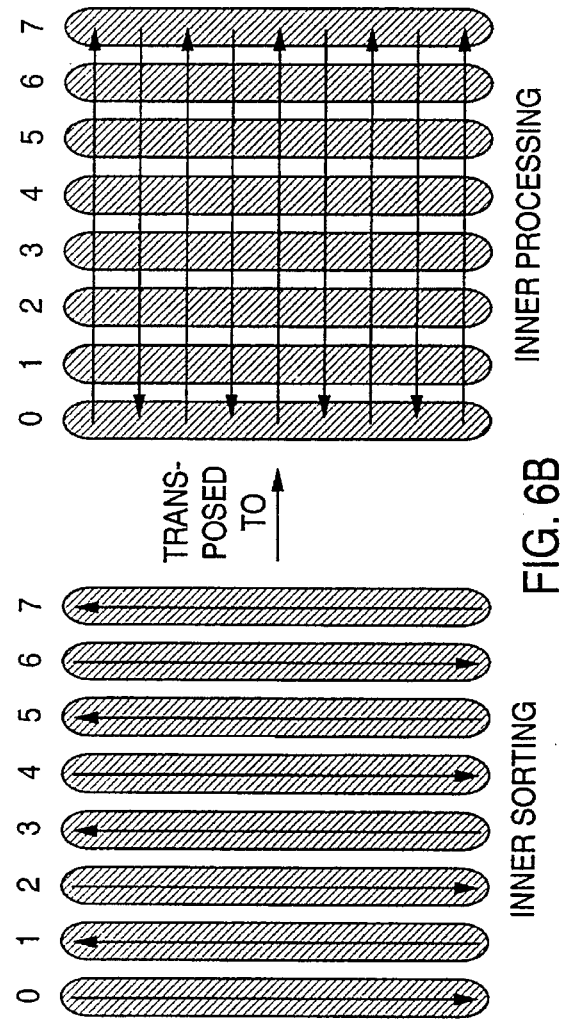
FIG. 6B is a schematic diagram used to explain inner sorting and transposing processes.

FIG. 6B is a schematic diagram used to explain the inner sorting process and the transposing process. The sort elements stored in the sort element storing unit 3 of each processing device 2 are sorted, in a sorting order (smaller-to-larger order or larger-to-smaller order) designated by the controlling unit 7. The sorted elements are stored in the sort element storing unit 3. In FIG. 6B, in the storing region 0, the sort elements are sorted in smaller-to-larger order, whereas in the storing region 1, the sort elements are sorted in the larger-to-smaller order. Thus, the sort elements are sorted in zigzag order and then stored. The sorting order of the inner sorting process depends on the stage number. The controlling unit 7 selects the sorting order corresponding to a stage number and controls the inner sorting unit 4 corresponding to the selected sorting order.

Sort elements are sorted in the smaller-to-larger or larger-to-smaller order according to the k-th bit of binary representation indicating processing device Pi in the case of the stage number k, where 0 indicates the small-to-larger order, while 1 indicates the larger-to-smaller order. For example, if there are four processing devices, the processing devices 0, 1, 2, and 3 are represented in binary as 00, 01, 10, and 11 respectively. Accordingly, at the stage 0, the sequence of bits 0,1,0,1 indicates smaller-to-larger, larger-to-smaller, smaller-to-larger, and larger-to-smaller order, respectively. At the stage 1, the sequence of bits 0,0,1,1 indicates smaller-to-larger, smaller-to-larger, larger-to-smaller, and larger-to-smaller respectively.

The element vector $V_i$ stored in the processing device Pi is given by the following equation.

$$Vi = [E_{i0}, E_{i1}, \ldots, E_{ij}, \ldots, E_{i\,N-1}] \quad (3)$$

where $E_{ij}$ is ($D/N^2$) element vectors being sorted.

Thus, the entire sort element vector V can be given by the following equation.

$$\begin{aligned} V &= \Sigma V_i \\ &= [V_0, V_1, \ldots, V_{N-1}] \\ &= [E_{00}, E_{10}, \ldots, E_{i0}, \ldots, E_{N-10}, \\ &\quad E_{01}, E_{11}, \ldots, E_{i1}, \ldots, E_{N-11}, \\ &\quad \ldots, \\ &\quad E_{0j}, E_{1j}, \ldots, E_{ij}, \ldots, E_{N-1j}, \end{aligned} \quad (4)$$

..., $E_{0N-1}, E_{1N-1}, \ldots, E_{iN-1}, \ldots,$ $E_{N-1\ N-1}]$

In other words, the vector $E_{ij}$ (j=0, 1, ..., and N−1) is stored in N storing regions of the processing device $P_i$.

Next, the controlling unit 7 activates the transposing unit S. The transposing unit 5 transposes the sort elements between a local processing device and the another processing device through the network 1.

In other words, as shown in FIG. 6B, the transposing unit 5 transposes the element $E_{ij}$ with the element $E_{ij}$. Thus, the transposing units 5 of the system transpose the element matrix V=[$V_0, V_1, \ldots, V_{N-1}$] of the entire vector. The transposing unit 5 of each processing device $P_i$ (i=0, 1, ..., and N−1) performs all-to-all port communication so as to send the element [$E_{i0}, E_{i1}, \ldots, E_{iN-1}$] to the processing devices $P_0, P_1, \ldots,$ and $P_{N-1}$. After the transposing process has been completed, the controlling unit 7 activates the comparing and substituting unit 6. The comparing and substituting unit 6 performs processes which are equivalent to the substituting, merging, and dividing processes which have been performed through a network according to the conventional system. According to the present invention, since the above-described transposing process is performed, the substituting, merging, and dividing processes can be performed as inner processes of each processing device.

Thus, the comparing and substituting unit 6 successively performs the merging process which was used in sub stages of the conventional system. The stage $S_j$ consists of (j+1) sub stages ($s_{j0}, s_{j1}, \ldots,$ and $s_{jj}$). In the sub stage $s_{jk}$, line i is merged with a line given by the function A (i, j, k)=i⊕$2^{j-k}$ (equation (1)). When B (i, j, k)=$i_{j+1} \oplus i_{j-k}$ (equation (2)), if B (i, j, k)=0, the first half unit of the merged vector is stored in the line i. In this condition, if B (i, j, k)=1, the second half unit of the merged vector is stored in the line i.

The stage 0 ($S_0$) consists of one sub stage ($s_{00}$). At the line 0 (i=0), since A (0, 0, 0)=0⊕$2^{0-0}$=0⊕1=1, the comparing and substituting unit 6 merges and substitutes the lines 0 and 1. At this point, by the equation (2), since B (0, 0, 0)=$0_{0+1}$⊕$0_{0-0}$=0⊕0=0, the first half (smaller) unit of the merged vector of the lines 0 and 1 is stored as elements of the line 0. Likewise, the merging and substituting process is performed for each line.

For example, the stage 1 ($S_1$) consists of two sub stages ($s_{10}$ and $s_{11}$). In this case, the sub stage $s_{10}$ is followed by the sub stage $s_{11}$. In the case of the line 0, in the sub stage $s_{10}$, since A (0, 1, 0)=0⊕$2^{1-0}$=0⊕2=2, the merging and substituting process is performed for the lines 0 and 2. Likewise, the merging and substituting process is performed for each other line. After all the lines have been processed, the sub stage $s_{11}$ is processed. In the sub stage $s_{11}$, at the line 0, since A (0, 1, 1)=0⊕$2^{1-1}$=0⊕1=1, the substituting and merging process is performed for the lines 0 and 1. The substituting method depends on the value of the function B (i, j, k).

After the merging and substituting process for all the sub stages has been performed, the controlling unit 7 activates the transposing unit 5. As with the above-described system, the transposing unit 5 performs the all-to-all port communication so as to transpose the sort elements.

Thus, the process sequence of the inner sorting process by the inner sorting unit 4, the transposing process by the transposing unit 5, the merging and substituting process by the comparing and merging unit 6, and the transposing process by the transposing unit 5 for one stage is completed.

After the above-described process sequence for one stage has been completed, the next stage is processed. This process sequence is repeated for each stage. The number of stages depends on the number of processing devices N (=$2^n$) (namely, n=log N). In other words, n stages are processed.

After the process sequence is repeated n times, the controlling unit 7 activates the inner sorting unit 4. The inner sorting unit 4 sorts the elements stored in the sort element storing unit 3. Thus, the process sequence is completed and each the vector V has been sorted.

Figure 7:
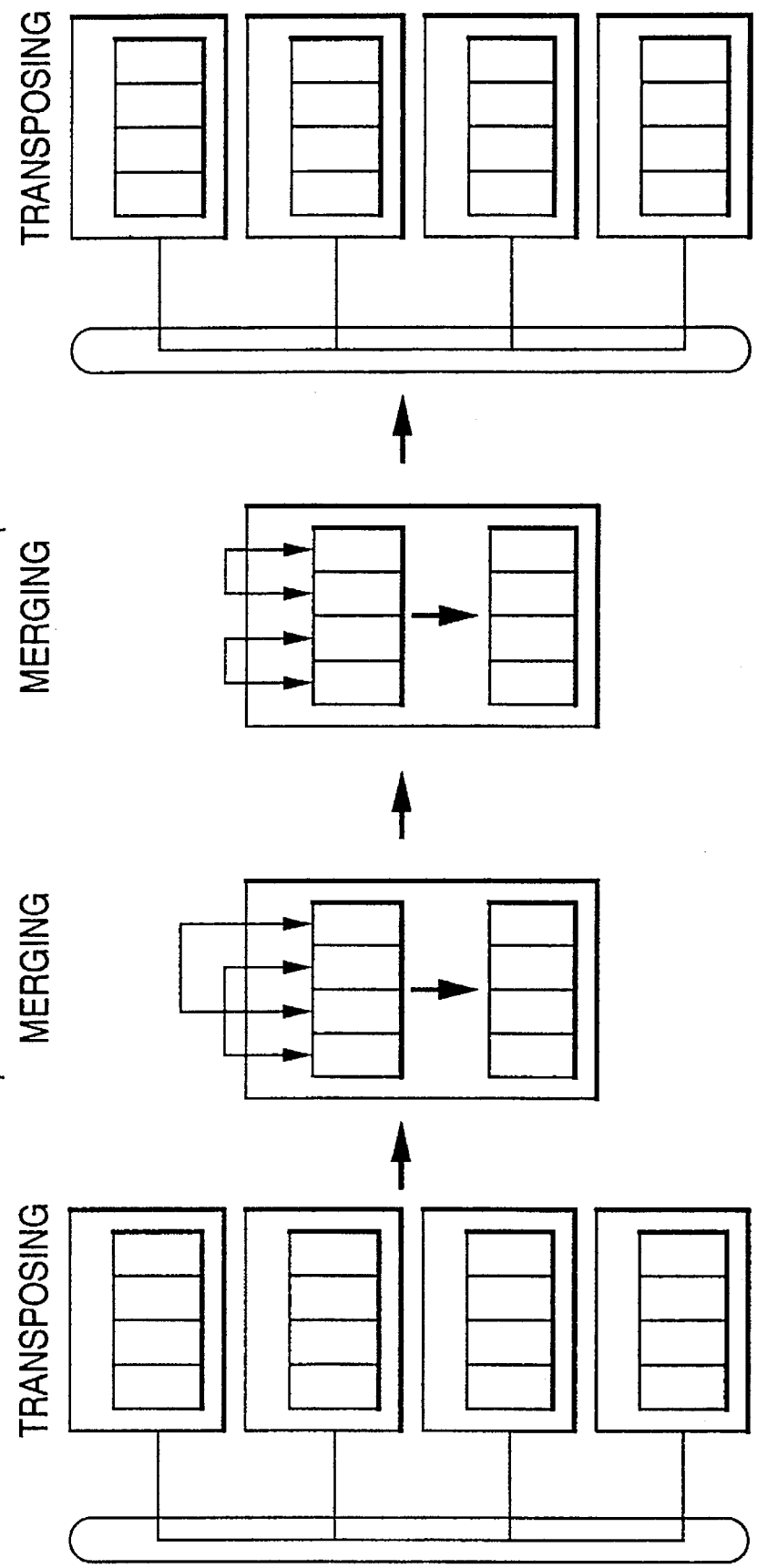
FIG. 7 is a schematic diagram used to explain the principle of a sorting system in accordance with the present invention.

FIG. 7 is a schematic diagram used to explain the sorting system according to the present invention.

In each stage, the inner sorting process is performed. Thereafter, the transposing process is performed through the network. Next, the merging and substituting process is repeated for each of the sub stages (namely, j times). Last, the transposing process is performed through the network.

According to the principles of the present invention shown in FIGS. 5–7, the number of times the communicating process is performed through the network is equal to the number of times the transposing process is effected. Thus, in each stage, the number of times the communicating process is performed is two. When the number of processing devices is N (=$2^n$), the number of stages is n. Thus, the number of times the transposing process (namely, the communicating process) is required for the parallel sorting process performed by N processing devices is 2n. In the conventional system, the number of times the communicating process is performed is n (n+1)/2. Thus, the ratio of the number of times the communicating process of the present invention is performed to that of the conventional system is given as follows.

$$\frac{\text{Number of times of communicating process of the system of present invention}}{\text{Number of times of communicating process of the conventional system}} = \frac{4}{n+1} \quad (5)$$

where the number of times the transposal communicating process is performed according to the present invention is considered to be equal to the number of times the communicating process for comparison is performed according to the conventional system. For example, in both systems, transposition or comparison can be completed in one communicating process. Thus, when n=3, that is, when the number of processing devices is $2^3$=8, the number of times a communicating process is performed according to the present invention is equal to that of the conventional system. When n>3 (namely, the number of processing devices is 16 or more), the number of times the communicating process is performed of the present invention is performed is smaller than that of the conventional system. Thus, in this case, the amount of communication can be reduced. When the number of processing devices is 16, the amount of communication occurring in the present invention is reduced to ⅘ of that of the conventional system. When the number of processing devices is 64, the amount of communication can be reduced to 4/7 of that of the conventional system. When the number of processing devices is 1024, the amount of communication can be reduced to 4/11 of that of the conventional system. Thus, the greater the increase in the number of processing devices, the greater the decrease in the amount of communication. Thus, the throughput of the parallel sorting process increases with an increasing number of processing devices.

FIG. 8 is a block diagram used to explain the principles of the present invention. In the present invention, N (=$2^n$) processing devices 2 (2-1, 2-2, ..., and 2-N) are connected in a network 1. Each processing device 2 comprises a network interface 10, a sort element storing unit 20, a substituting unit 21, a merging and dividing unit 22, and a controlling unit 23.

The network interface 10 interfaces with the is network 1. In the inner sorting process according to the present invention, the sort element storing unit 20 stores sort elements where all elements to be sorted are divided by N.

The substituting unit 21 sends either a first half (smaller) unit or a second half (larger) unit of sort elements stored in the sort element storing unit to another processing device 2 through the network interface 10.

The merging and dividing unit 22 merges the sort elements received from the other processing device 2 through the network interface 10 with the second half unit or the first half unit which has not been sent to the other processing device 2, sorts the merged elements, divides the sorted elements into a smaller (first half) unit and a larger (second half) unit, and separately stores them.

The controlling unit 23 controls the substituting unit 21, the merging and dividing unit 22, and the network interface 10. In other words, the controlling unit 23 controls the entire process sequence of the processing device 2. In addition, the controlling unit 23 selects which of the first half unit or the second half unit of the sort elements the substituting unit 21 sends to which processing device 2. Moreover, the controlling unit 23 controls the substituting unit 21 and the network interface 10.

According to the second embodiment shown in FIG. 8, in the substituting and merging process, only the smaller (first half) unit or larger (second half) unit of sort elements stored in the sort element storing unit 20 is substituted with that of the other processing device through the network. Thus, the amount of communication can be reduced.

Next, the operation of the system shown in FIG. 8 will be described.

When N ($=2^n$) processing devices 2 (2-1, 2-2, ..., and 2-N) which are connected in a network as a general-purpose connection network sort element V in parallel, the sort element V is divided into N and stored in a sort element storing unit 20 of each processing device 2.

Now, assume that a processing device $P_i$ stores a vector $V_i$ (where i=0, 1, ..., and N−1). The processing device $P_i$ sorts the element vector $V_i$ stored in the sort element storing unit 20. Next, the processing device $P_i$ divides the sorted element vector $V_i$ into $L_i$ and $H_i$ and then separately stores $L_i$ and Thereafter, the processing device $P_i$ activates the substituting unit 21 and the merging and dividing unit 22 so as to perform the following substituting process, and the merging process for the vector, between the local processing device and the other processing device.

The substituting and merging process is performed for [log N+1] (=n+1) stages ($S_0$, $S_1$, ..., and $S_n$). Each stage $S_j$ consists of (j+1) sub stages ($s_{j0}$, $s_{j1}$ ..., and $s_{jj}$. However, when j=n (namely, in the last stage), the number of sub stages is n ($s_{n0}$, $s_{n1}$, ..., and $s_{n\ n-1}$). In each sub stage, the substituting and merging process is performed.

In the sub stage $s_{jk}$, a processing device with which the processing device $P_i$ substitutes a vector is given by the following function A (i, j, k). At this point, if the value of the following function B (i, j, k) is 0, the vector Hi of the second half unit is sent to the designated processing device. In this condition, if the value of B (i, j, k) is 1, the vector $L_i$ of the first half unit is sent to the designated processing device.

$$A(i, j, k) = 2^k \oplus i \quad (6)$$

$$B(i, j, k) = i_{j+1} \oplus i_j \oplus i_k \quad (7)$$

For example, in the sub stage $s_{00}$, a processing device which is the substituting partner of the processing device $P_0$ is the processing device $P_1$ because of A (0, 0, 0) $-2^0 \oplus 0-1 \oplus 0=1$. Since B (0, 0, 0)$=0_1 \oplus 0_0 \oplus 0_0 = 0 \oplus 0 \oplus 0 = 0$. Thus, the processing device $P_0$ sends the vector $H_0$ of the second half unit stored in the sort element storing unit 20 to the processing device $P_1$. On the other hand, the substituting parmer of the processing device $P_1$ is the processing device $P_0$. Thus, the processing device $P_1$ sends the vector $L_0$ of the first half unit to the processing device $P_0$.

When a vector to be substituted is received from the substituting partner, the controlling unit 23 activates the merging and dividing unit 22.

In the sub stage $s_{jk}$, the merging and dividing unit 22 of the processing device $P_i$ merges the vector which has not been sent to the substituting partner A (i, j, k) (namely, either the second half unit $H_i$ or the first half unit $L_i$) with the vector received from the substituting partner A (i, j, k) and then sorts the merged vector. Thereafter, the merging and dividing unit 22 divides the merged vector into a first half unit $L_i$ and a second half unit $H_i$ and then separately stores them in the sort element storing unit 20. In other words, when the processing device sends the second half unit Hi to the substituting partner A (i, J, k), the merging and dividing unit 22 merges the first half unit $L_i$ with the vector received from the substituting partner A (i, j, k). On the other hand, when the processing device sends the first half unit $L_i$ to the substituting partner A (i, j, k), the merging and dividing unit 22 merges the second half unit $H_i$ with the vector received from the substituting partner A (i, j, k).

For example, in the sub stage $s_{00}$, since the processing device $P_0$ sends the vector $H_0$ of the second half unit to the processing device $P_1$, the merging and dividing unit 22 merges the vector $L_0$ of the first half unit with the vector received from the processing device $P_1$.

The above-described substituting and merging process is performed for each sub stage of each stage.

After the substituting and merging process in the last sub stage $s_{n\ n-1}$ has been completed, an dement $U_m$ of the complete vector U ($U_0$, $U_1$, ..., $U_m$, ..., $U_{n-1}$) which has been sorted is stored in the sort element storing unit 20 of the processing device Pi (where m=i+(N/2−1)*($i_0-i_{n-1}$)).

According to the system shown in FIG. 8, the number of times the communicating process is performed through the network becomes a total of (sub stage number+1) for each stage i (except that in the last stage n the number of sub stages is n). In other words, the number of times the communicating process is performed is given by n (n+3)/2. In addition, according to the present invention, a half of each of all the vectors is substituted. Thus, the number of elements to be communicated becomes half of that of the conventional system. Thus, the ratio of the amount of communication of the present invention to that of the conventional system is given as follows.

$$\frac{\text{Amount of communication of the system of present invention}}{\text{Amount of communication of conventional system}} = \quad (8)$$

$$\frac{1}{2} \times \frac{n(n+3)/2}{n(n+1)/2} = \frac{n+3}{2(n+1)}$$

Thus, when n=2 (namely, the number of processing devices is four), the amount of communication of the system according to the present invention becomes 5/6 times that of the conventional system. When n=4 (namely, N=16), the amount of communication of the system according to the present invention becomes 7/10 times that of the conventional system. When n=6 (namely, N=64), the amount of communication of the system according to the present invention becomes 9/14 times that of the conventional system. When n=8 (namely, N=256), the amount of communication of the system according to the present invention becomes 11/18 times that of the conventional system. Thus, the greater the value of n (namely, the greater the number of processing devices), the more the effect improves. Thus, the throughput of the parallel sorting process improves as the number of processing devices increases.

DESCRIPTION OF PREFERRED EMBODIMENTS

Next, with reference to the accompanying drawings, the preferred embodiments of the present invention will be described.

Figure 9:
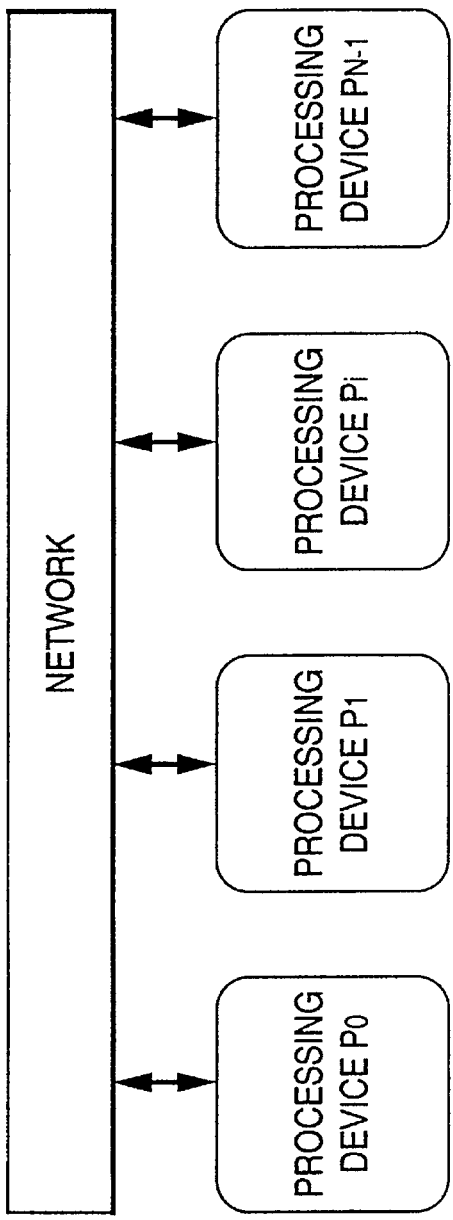
FIG. 9 is a block diagram showing a system according to the first embodiment of the present invention.

FIG. 9 is a block diagram showing a basic construction of a first embodiment of the present invention. The above-described principles of the invention which were discussed with respect to FIGS. 5 through 8 can be accomplished by the basic construction shown in FIG. 9. In other words, N processing devices P ($P_0$, $P_1$, . . . , and $P_{N-1}$) are connected in a network. In accordance with the first embodiment, the number of processing devices is designated to N=2n. Each processing device can be constructed of a conventional computer system or a dedicated sort-processing device.

Figure 10:
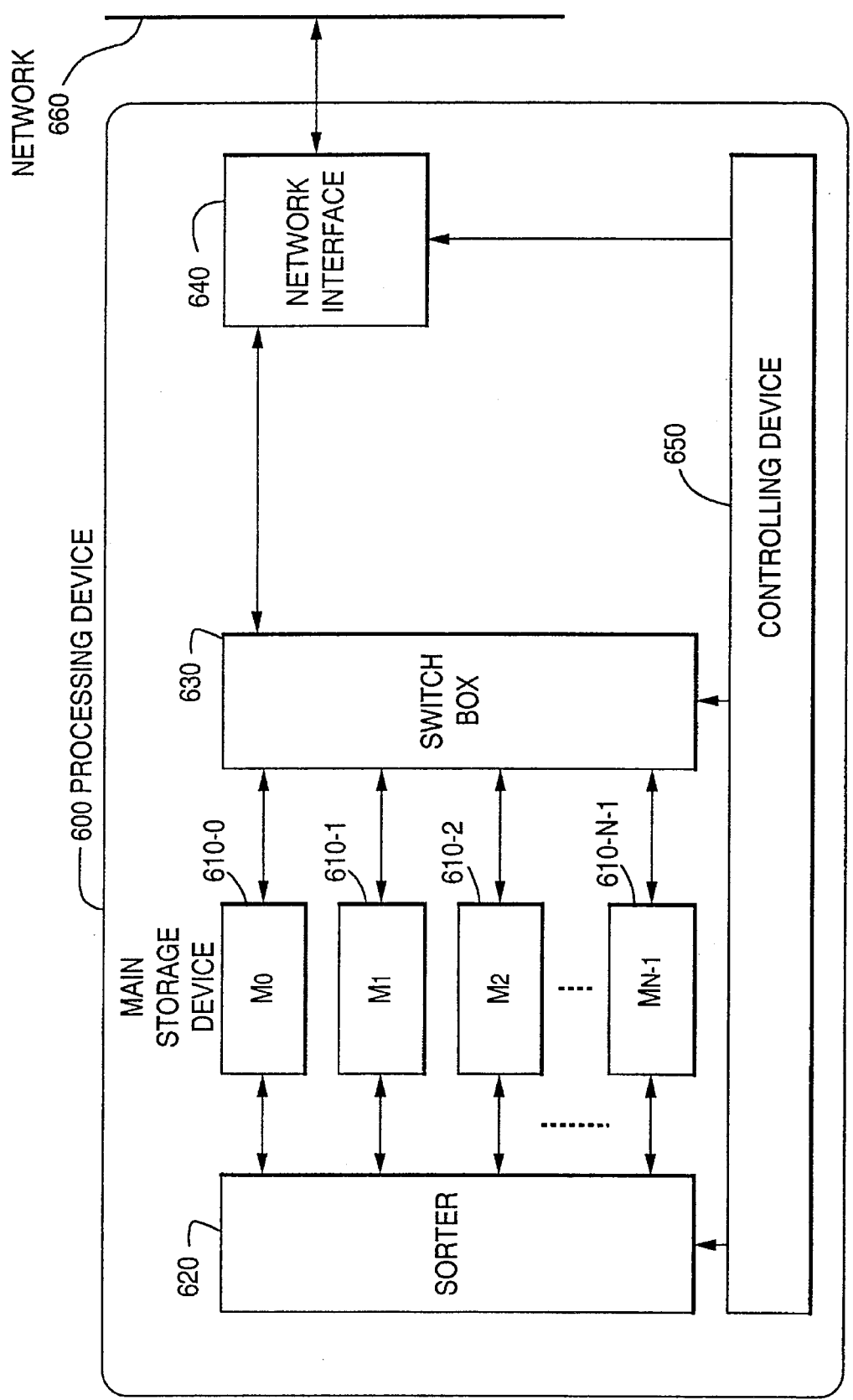
FIG. 10 is a block diagram showing a system according to the first embodiment of the present invention.

FIG. 10 is a block diagram showing a processing device in accordance with the first embodiment of the present invention. The block diagram FIG. 10 shows the inner construction of one processing device. The N (=$2^n$) processing devices connected through the network and shown in FIG. 9 have the same construction.

In FIG. 10, reference numeral 600 is a processing device. The processing device 600 is connected in a network 660. The processing device 600 has a main storing device M 610, a sorter 620, a network interface 640, a switch box 630, and a controlling device 650. The main storage device M 610 has N blocks (610-0, 610-1, . . . , and 610-N) each of which stores a sort element vector. Thus, the main storage device M 610 stores a total of N sort element vectors. The sorter 620 sorts the element vectors stored in the main storage device M 610. The network interface 640 interfaces with the network 660. The switch box 630 switches the N blocks of the main storage device M 610. The controlling device 650 controls the processing device 600.

Since one processing device has N blocks of main storage device M 610, N processing devices store a total of $N^2$ blocks. In the $N^2$ blocks, elements to be sorted are stored.

Figure 11:
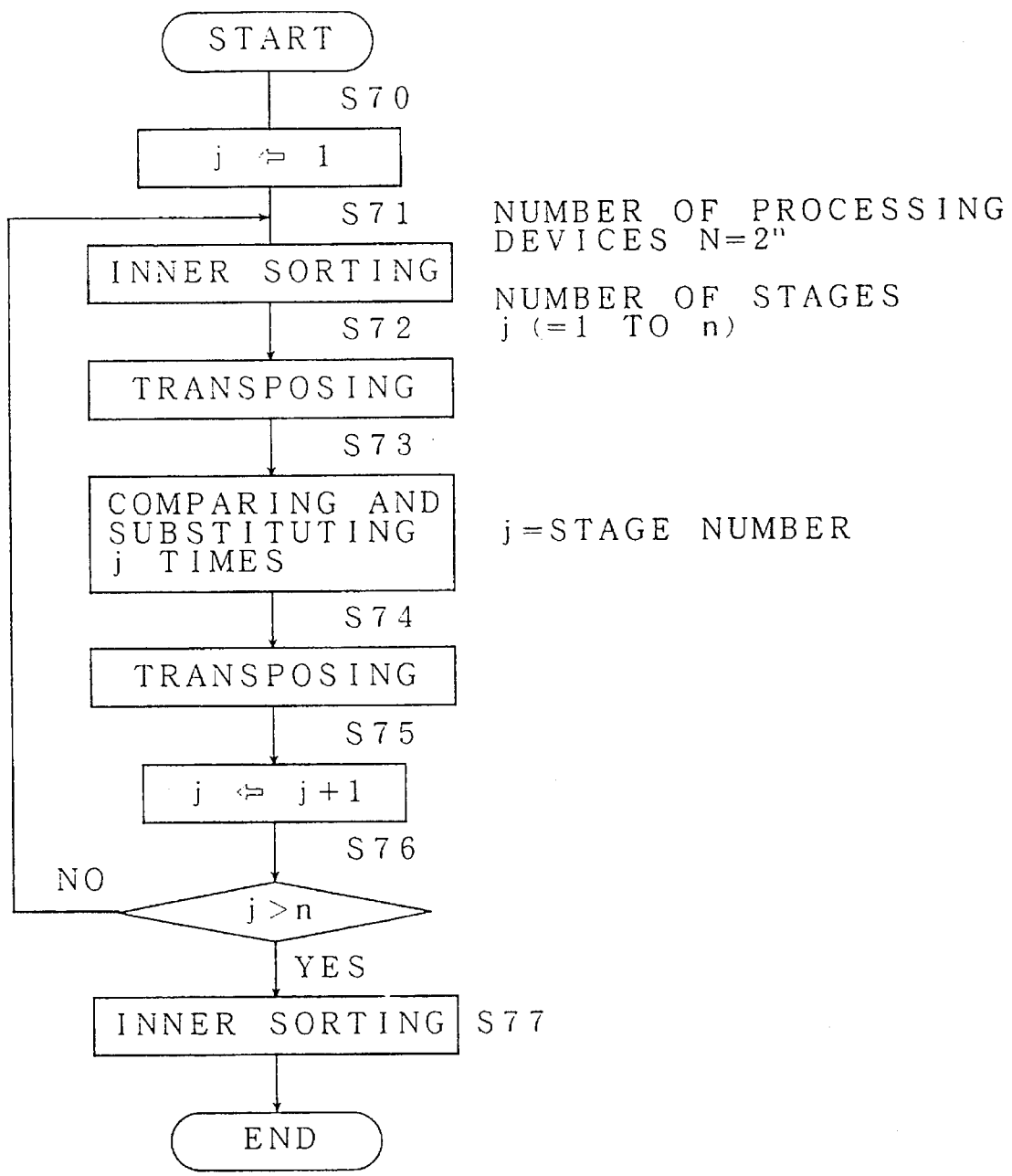
FIG. 11 is a flow chart showing the operation of the first embodiment of the present invention.

FIG. 11 is a flow chart showing an operation of the first embodiment.

As described above with respect to the operation of the first invention according to FIG. 5, the sorting process is performed for n stages. In each stage, the inner sorting process (S71), the transposing process (S72), the comparing and substituting process (S73), and the transposing process (S74) are performed in the order shown in FIG. 11. The process sequence is controlled by the controlling device 650. Since the process sequence is started from the stage 1, "1" is substituted into the stage number j (S70).

The sorter 620 of the processing device 600 then performs the inner sorting process (S71). The controlling device 650 controls the sorting sequence.

Next, the transposing process (S72) is performed by the main storage device 610, the switch box 630, the network interface 640, and the controlling device 650 of the processing device 600. When the blocks of the main storage device 610 are denoted by $M_{i0}$, $M_{i1}$, . . . , $M_{ij}$, . . . , and $M_{i\,N-1}$, in the transposing process, elements stored in the block $M_{ij}$ of the main storage device are sent to the block $M_{ji}$ of the main storage device of the processing device $P_j$ and stored therein. The controlling device 650 controls the switch box 630 so as to successively read the contents of the blocks $M_{i0}$, $M_{i1}$, . . . , $M_{ij}$, . . . , and $M_{i\,N-1}$ of the main storage unit 610. In addition, the controlling device 650 controls the network interface 640 so as to transfer the element vector, which has been read from the block, to the designated processing device.

On the other hand, the other processing device sends a sort vector to the local processing device. In other words, the contents of the block $M_{ji}$ of the main storage device of the processing device $P_j$ are sent to the processing device $P_i$ through the network interface 640. The controlling device 650 controls the switch box 630 so that the vector received from the processing device $P_j$ is stored in the block $M_{ij}$ of the main storage device of the processing device $P_i$.

The transposing process is performed through the network 660 by all-to-all port communication.

Next, the comparing and substituting process is performed (S73). The comparing and substituting process is performed between the sorter 620 and the main storage device 610 under the control of the controlling device 650. In the stage j, the comparing and substituting process is performed successively for j sub stages. In each sub stage, the comparing and substituting process is performed.

In the comparing and substituting process, two blocks of the main storage device of the processing device 600 are used as a pair. The vectors stored in the two blocks are compared and substituted. The pair of blocks of the main storage device are given by the equation (1) (namely, function A (i, j, k)) which was described above with respect to the operation of the invention. On the other hand, the direction of substitution is given by the equation (2) (namely, function B (i, j, k)). In these functions, i is the block number of the main storage device 610; j is the stage number; and k is the sub stage number of the j stage.

By the two equations (1) and (2), the controlling device 650 selects two blocks of the main storage device of a substituting partner and a substituting method (which is performed after the merging process). The controlling device 650 controls the sorter 620 is corresponding to the blocks and method which have been selected. The sorter 620 reads the contents of the blocks $M_m$ and $M_n$ of the main storage device selected by the controlling device 650. Thereafter, the sorter 620 sorts the contents being read and then stores them in the blocks $M_m$ and $M_n$ corresponding to the selection of the controlling device 650. In other words, the sorter 620 stores a smaller (first half) vector to the block $M_m$ or $M_n$ of the main storage unit and a larger (second half) vector to the other block (namely, $M_n$ or $M_m$).

This comparing and substituting process is repeated for each of the sub stages (namely, j times).

After the comparing and substituting process has been completed, the transposing process is performed again (S74) in the same manner as performed earlier.

Thus, the process sequence (comprising the inner sorting process, the transposing process, the comparing and substituting process, and the transposing process) is completed for one stage.

After the process sequence has been repeated n times (namely, for n stages) (S75 and S76), the sorting process for all sort elements is completed.

Figure 12:
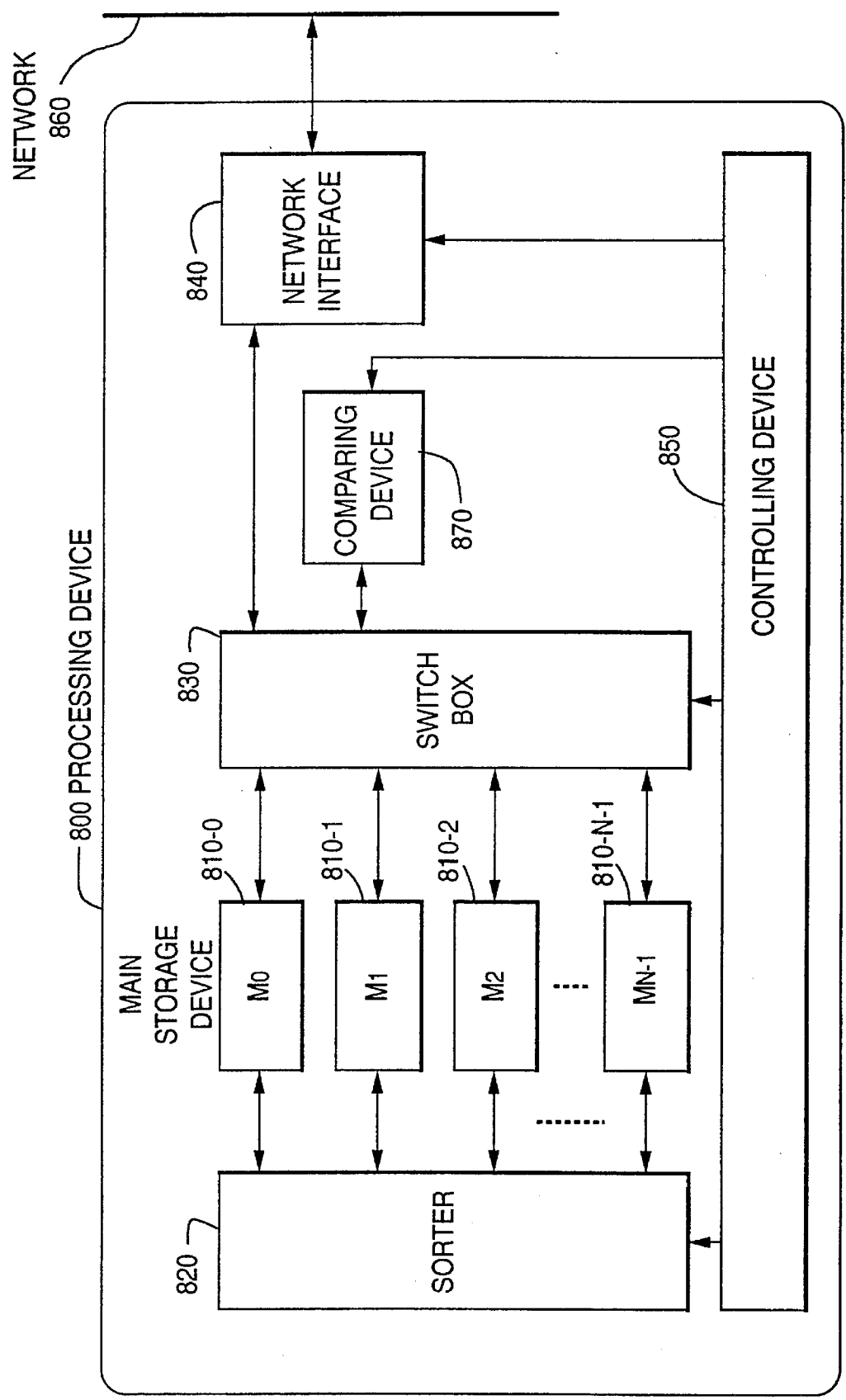
FIG. 12 is a block diagram showing a system (where one sort element is stored in each block of a main storage device) according to a second embodiment of the present invention.

FIG. 12 is a block diagram showing a construction of a system in accordance with a second embodiment of the present invention. Unlike with main storage device 610 which has blocks $M_0$ to $M_{N-1}$ where vectors are stored (FIG. 10), in the system shown in FIG. 12, one numeric value is stored in each block of the main storage device M 810. In this system, a total of N ($=2^n$) processing devices, each having the same construction, are connected in a network.

In FIG. 12, reference numeral 800 is a processing device. The processing device 800 is connected to a network 860. The processing device 800 comprises a main storage device M 810, a sorter 820, a network interface 840, a switch box 830, a controlling device 850, and a comparing device 870. The main storage device M 810 consists of N blocks (810-0, 810-1, . . . , and 810-N-1), each of which stores a sort element. Thus, the main storage device M 810 stores a total of N sort elements. The sorter 820 sorts the elements stored in the main storage device M 810. The network interface 840 interfaces with the network 860. The switch box 830 switches the N blocks of the main storage device M 810. The controlling device 850 controls the processing device 800.

This system performs a process sequence for n stages. In accordance with the construction shown in FIG. 12, the blocks $M_o$ to $M_{N-1}$ of the main storage device 810 each store one sort element. Thus, in the comparing and substituting process, two numeric values are compared and substituted. Unlike with the system shown in FIG. 10, the comparing and substituting process is not performed by the sorter 820. In the system shown in FIG. 12, the comparing device 870 is used to perform the comparing and substituting process. The comparing device 870 is connected to the switch box 830. The comparing device 870 is controlled by the controlling device 850.

The process sequence performed in the system shown in FIG. 12 is the same as that in the system shown in FIG. 10 except for the comparing and substituting process (S73 in FIG. 11).

In the construction shown in FIG. 12, the comparing and substituting Process (S73) is performed by the comparing device 870, the switch box 830, the main storage device 810, and the controlling device 850.

The controlling device 850 selects blocks of the main storage device of a substituting partner and a substituting method (which is performed after the merging process) corresponding to the equations (1) and (2) so as to control the switch box 830. The comparing device 870 reads the contents of the blocks MM and Mn of the main storage device selected by the controlling device 850 through the switch box 830 so as to compare them. Thereafter, the comparing device 870 stores the compared contents in the blocks $M_m$ and $M_n$ corresponding to the selection of the controlling device 850 through the switch box 830.

This comparing and substituting process is repeated for each of the sub stages (namely, j times).

FIG. 13 is a schematic diagram used to explain a system having four processing devices which sort 16 numeric values according to the second embodiment of the invention as shown in FIG. 12.

In FIG. 13, four processing devices 1 to 4 each have a main storage device having four blocks. Each block stores one numeric value. As shown in (a) in FIG. 13, the blocks in the main storage device of the processing device 1 store (8, 11, 1, 3). The blocks in the main storage device in the processing device 2 store (6, 9, 16, The blocks of the main storage device of the processing device 3 store (2, 10, 12, 13). The blocks of the main storage device of the processing device 4 store (14, 7,5,4).

Since the number of the processing devices is four ($=2^2$), the sorting process is performed for two stages (namely, stage 1 and stage 2).

In the first stage (S70 of FIG. 11), the inner sorting process is performed (S71). At this point, under the control of the controlling device 850, the processing device 1 sorts the numeric values stored in the main storage device 810 in smaller-to-larger order and stores the sorted result in the main storage device 810. The processing device 2 sorts the numeric values stored in the main storage device 810 in the larger-to-smaller order and stores the sorted result in the main storage device 810. The processing device 3 sorts the numeric values stored in the main storage device 810 in smaller-to-larger order and stores the sorted result in the main storage device 810. The processing device 4 sorts the numeric values stored in the main storage device 810 in the larger-to-smaller order and stores the sorted result in the main storage device 810 (see (b) in FIG. 13).

Next, the transposing process is performed through the network 860 (S72). The transposed results are stored in the main storage device 810 of each of the processing devices 1 to 4 (see (c) in FIG. 13).

Next, the comparing device 870 performs the comparing and substituting process (S73). In the first stage, the comparing and substituting process is performed once. The controlling device 850 selects the partner for the comparing and substituting process and the substituting method corresponding to the equations (1) and (2) so as to control the comparing device 870 and the switch box 830. In the comparing and substituting process, the comparing device 870 compares the numeric value of the line 0 with that of the line 1 and then the switch box 830 stores the larger numeric value in the line 1 and the smaller numeric value in the line 0. Thereafter, the comparing device 870 compares the numeric value of the line 2 with that of the line 3 and then the switch box 830 stores the larger numeric value in the line 2 and the smaller numeric value in the line 3 (see (d) in FIG. 13).

Thereafter, the transposing process is performed through the network 860 (S74). The transposed results are stored in the main storage device 810 of each of the processing devices (see (e) in FIG. 13). Thus, the process sequence for the first stage is completed.

Next, the process sequence for the second stage is performed (S75 and S76).

First, the inner sorting process is performed (S71). The sorted result is stored in the main storage unit 810 (see (f) in FIG. 13). At this point, the processing devices 1 and 2 sort their sort elements in smaller-to-larger order, whereas the processing devices 3 and 4 sort their sort elements in larger-to-smaller order. The sorter 820 is controlled by the controlling device 850.

Next, the transposing process is performed through the network 860 (S72). The transposed result is stored in the main storage device 810 (see (g) in FIG. 13). Thereafter, the comparing and substituting process is performed (S73). In the second stage, the comparing and substituting process is performed twice. In the first comparing and substituting process, the lines 0 and 2 are compared. The larger element is stored in the line 2, whereas the smaller element is stored in the line 0. In addition, the lines 1 and 3 are compared. The larger element is stored in the line 3, whereas the smaller element is stored in the line 1 (see (h) in FIG. 13). In the second comparing and substituting process, the lines 0 and 1 are compared. The larger element is stored in the line 1, whereas the smaller element is stored in the line 0. In addition, the lines 2 and 3 are compared. The larger element is stored in the line 3, whereas the smaller element is stored in the line 2 (see (i) in FIG. 13). Thereafter, the transposing process is performed (S74). Thus, the process sequence for the second stage is completed (see (j) in FIG. 13).

When the number of processing devices is four, there are two stages (YES at S76). In this case, after the process sequence for the second stage has been completed, the inner sorting process (S77) is performed. At this point, the controlling device 850 of each of the processing devices 1 to 4 controls the sorter 820 so as to sort the numeric values stored in the main storage device in smaller-to-larger order. Thus, the sorted result is obtained in each of the processing devices (see (k) in FIG. 13). Consequently, the numeric values (1, 2, 3, 4), (5, 6, 7, 8), (9, 10, 11, 12) and (13, 14, 15, 16) are stored in the processing devices 1 to 4, respectively.

In the example shown in FIG. 13, a sort element stored in each block of the main storage device is one numerical value. When the sort element is a vector, provided that the processing device conducts a process as shown in FIG. 10, each vector can be sorted. $N^2$ or more sort vectors can be sorted by N processing devices.

Figure 14:
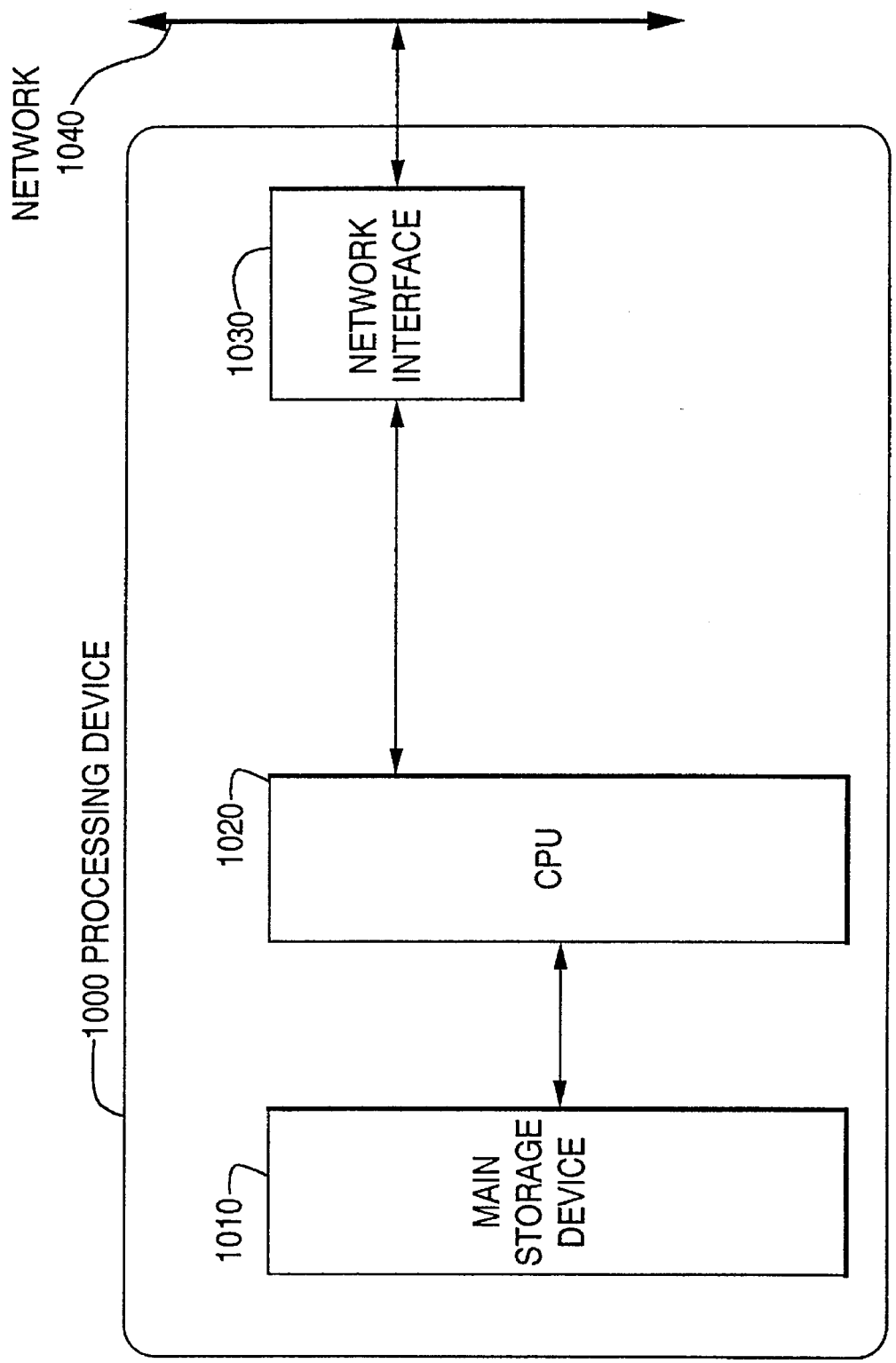
FIG. 14 is a block diagram showing a system according to a third embodiment of the present invention.

FIG. 14 is a block diagram showing a system according to a third embodiment of the of the present invention. The third embodiment operates in accordance with the principles of the invention shown in FIG. 5 through 7. In accordance with the third embodiment, N (=$2^n$) processing devices which have the same construction are connected in a network so as to form a loosely connected parallel computer. In FIG. 14, one of the processing devices is shown.

As shown in FIG. 14, reference numeral 1000 is a processing device which is constructed of a conventional computer system. The processing device 1000 comprises a main storage device 1010, a CPU 1020, and a network interface 1030. The processing device 1000 is connected to a network 1040 through the network interface 1030. The main storage device 1010 stores N sort element vectors and a program which controls the sorting process as per the process shown in the flow chart shown in FIG. 11.

The program controls the sorting process sequence as per the process shown in the flow chart shown in FIG. 11. In other words, when the number of processing devices is N (=$2^n$), the program controls the process sequence for n stages. The process sequence consists of an inner sorting process, a first transposing process, a comparing and substituting process, and a second transposing process.

In the inner sorting process, the CPU 1020 sorts N sort element vectors stored in the main storage device 1010. In the transposing process, the CPU 1020 controls the network interface 1030 so as to output a sort element vector to be substituted to the network 1040. The network 1040 substitutes and transposes a vector stored in the processing device with that received from another processing device under the control of a controlling means of the network 1040. The CPU 1020 stores a vector which has been transposed and received from the network interface 1030 to the main storage device 1010.

For the sort element vector which has been transposed and received through the network interface 1030, the comparing and substituting process is performed. The partner and method for the comparing and substituting process are determined by the program stored in the main storage device 1010. When the four processing devices shown in FIG. 13 are used in the system shown in FIG. 14, the comparing and substituting process, performed twice in the stage 2, can be substituted with one inner sorting process.

Thereafter, the transposing process is performed again. After the process sequence has been repeated for n stages, the content of the main storage device 1010 is sorted.

Figure 15:
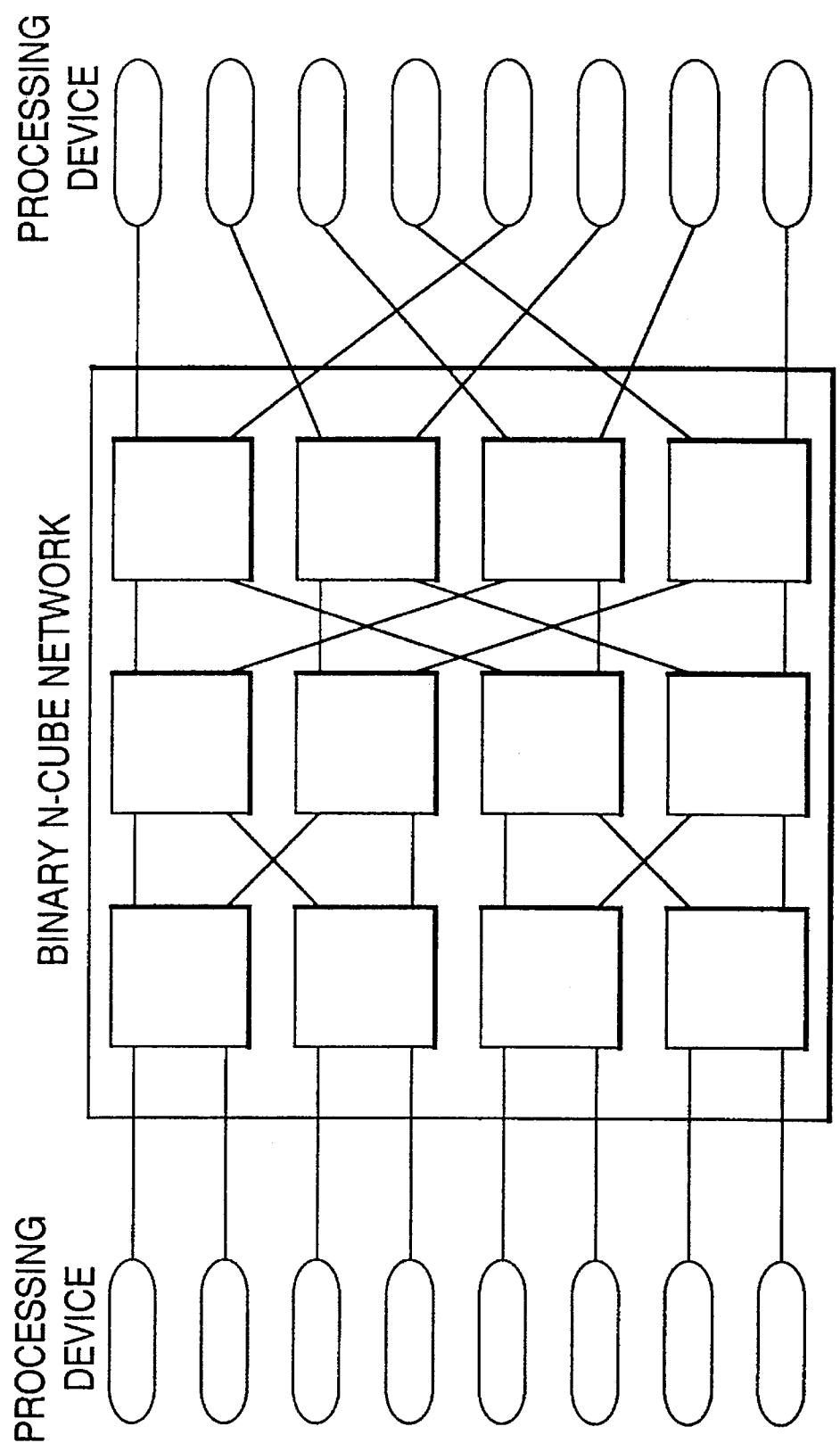
FIG. 15 is a schematic diagram showing a system of a binary cube network according to a fourth embodiment of the present invention.

FIG. 15 is a block diagram showing a system in accordance with fourth embodiment of the present invention. The fourth embodiment operates in accordance with the principles described with respect to FIG. 5 above.

In FIG. 15, each processing device i., 3 the same as a processing device of the general-purpose loosely connected parallel computer according to t,he third embodiment. Thus, each processing device shown in 15 comprises a main storage device, a CPU, and a network interface which are connected with a bus. These processing devices are connected in a binary n-cube network as a multiple connection network. In this case, the binary n-cube network is considered to be a switch box which performs all-to-all port communication. The main storage device of each processing device stores N sort element vectors and a program which operates the CPU. The CPU controls the network interface and substitutes vectors for the transposing process corresponding to the program.

Figure 16:
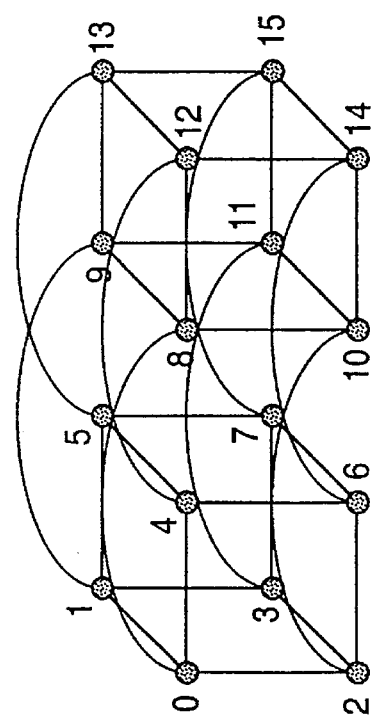
FIG. 16 is a schematic diagram showing a system of a hyper-cube network according to a fifth embodiment of the present invention.

FIG. 16 is a schematic diagram showing a system in accordance with a fifth embodiment of the present invention. The fifth embodiment operates in accordance with the principles of the invention described above with respect to FIGS. 5–8.

In FIG. 16 points 0 to 15 are processing devices of the general-purpose loosely connected parallel computer according to the third embodiment. These points are connected in a four-dimensional hyper-cube network as a multiple connection network. In the hyper-cube network, all-to-all port communication is performed. The main storage device of each processing device stores N sort element vectors and a program which operates the CPU. The CPU controls the network interface and substitutes the vectors for the transposing process corresponding to the program.

Figure 17:
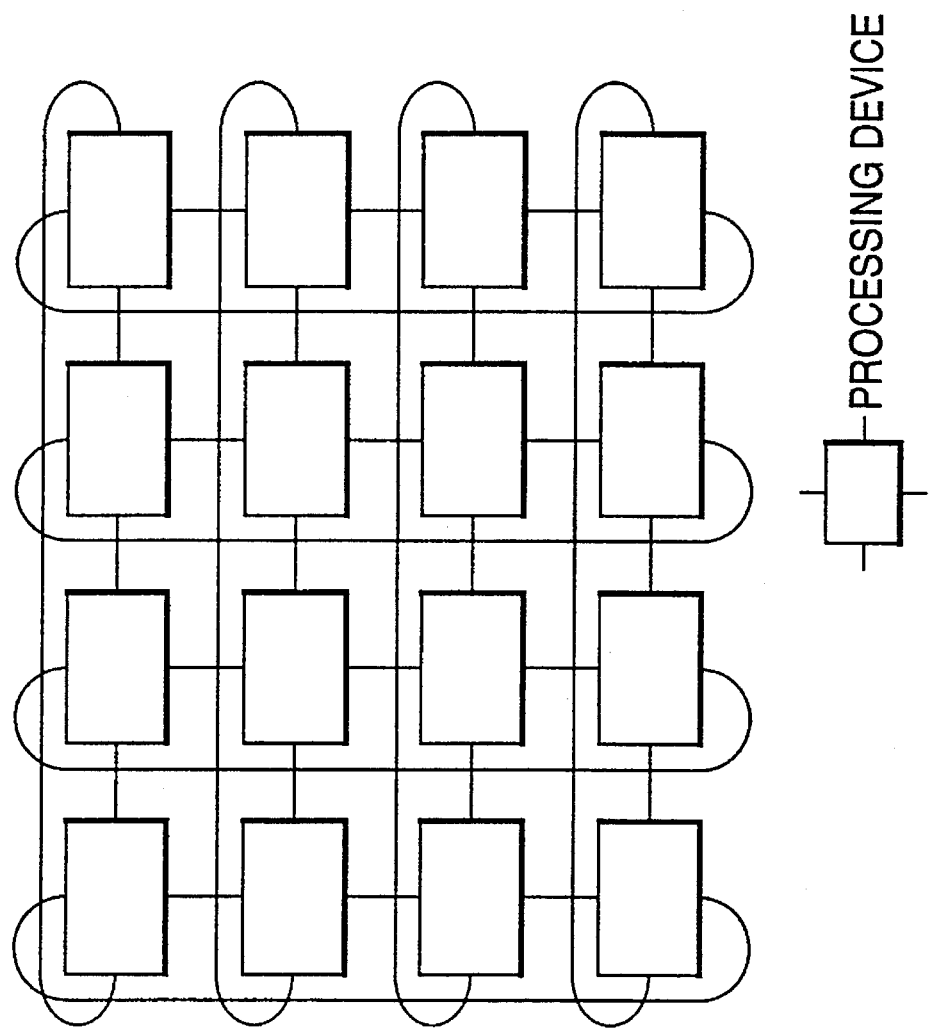
FIG. 17 is a schematic diagram showing a system of a torus network according to a sixth embodiment of the present invention.

FIG. 17 is a schematic diagram showing a system according to a sixth embodiment of the present invention. The sixth embodiment operates in accordance with the principles described above with respect to FIGS. 5–8.

Each processing device of this system is the same as the processing device of the general-purpose loosely connected parallel computer according to the third embodiment. The processing devices of this system are connected in a torus network as a multiple connection network. In the torus network, all-to-all port communication is performed. The main storage device of each processing device stores N sort element vectors and a program which operates the CPU. The CPU controls the network interface and substitutes vectors for the transposing process corresponding to the program.

Figure 18:
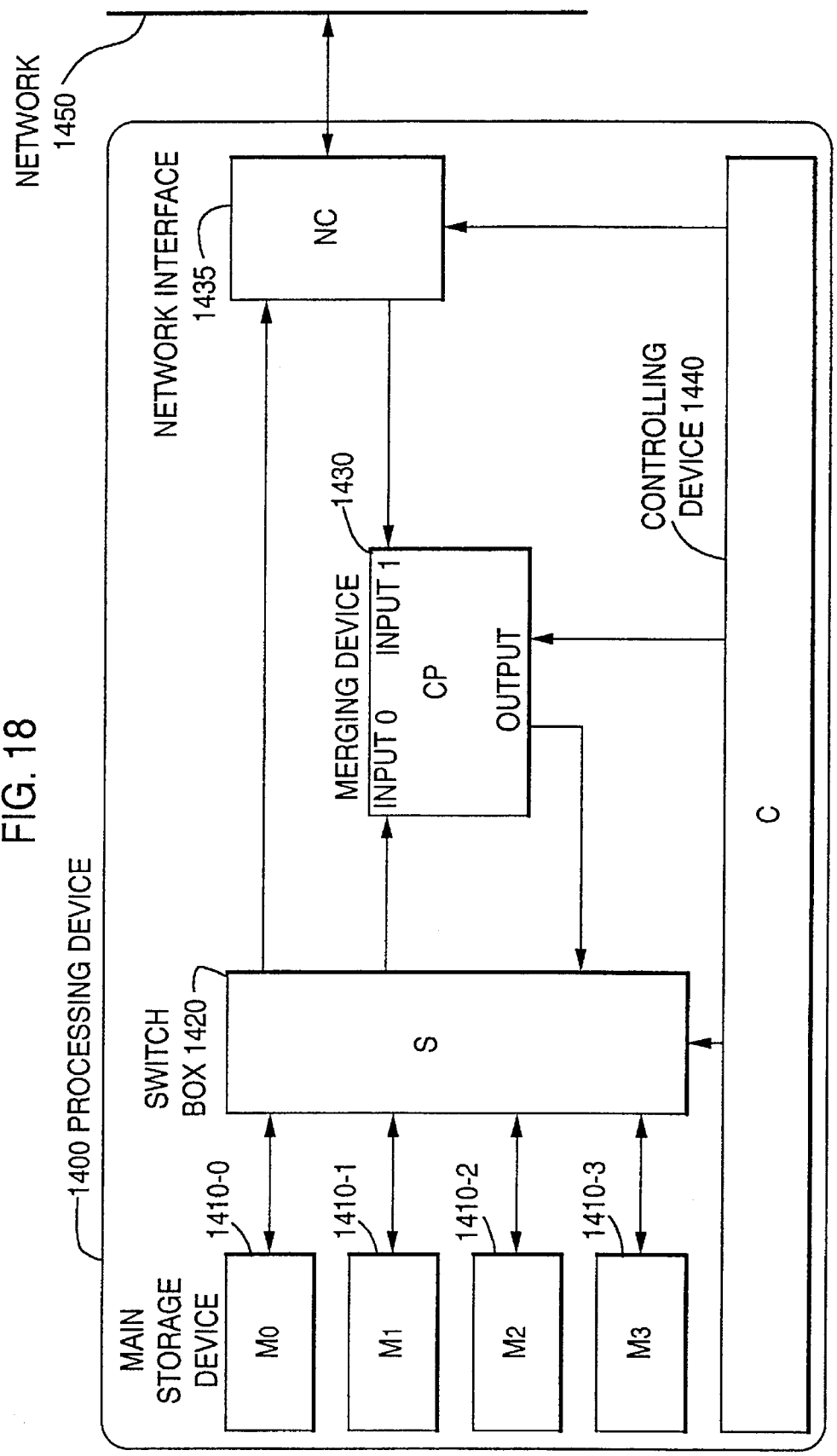
FIG. 18 is a block diagram showing a system according to a seventh embodiment of the present invention.

FIG. 18 is a block diagram showing a system in accordance with a seventh embodiment of the present invention. The seventh embodiment operates in accordance with the principles of the invention described with respect to FIG. 9 above. In FIG. 18, one processing device is shown. However, all N (=$2^n$) processing devices connected in the network shown in FIG. 9 have the same construction.

In FIG. 18, reference numeral 1400 is a processing device. The processing device 1400 is connected to a network 1450. The processing device 1400 comprises a main storage device m 1410, a switch box 1420, a merging device 1430, a network interface 1435, and a controlling device 1440. The main storage device 1410 consists of four blocks 1410-0, 1410-1, 1410-2, and 1410-3, each of which stores a sort element vector. The switch box 1420 switches the blocks of the main storage device M 1410. The merging device 1430 merges two vectors and then sorts the merged vector. In addition, the merging device 1430 stores the sorted vector in the main storage device 1410 through the switch box 1420.

The network interface 1435 interfaces with the network 1450. The controlling device 1440 controls the sorting process of the processing device 1440.

Two of the four blocks ($M_0$ to $M_3$) of the main storage device 1410 store a larger vector and a smaller vector of the sort element vectors that the processing device 1400 stores. The remaining two blocks store a new larger vector and a new smaller vector of the merged vector.

The switch box 1420 is connected to the blocks of the main storage device 1410. The switch box 1420 switches the blocks of the main storage device 1410 which are connected to the network interface 1435 and the merging device 1430 under the control of the controlling device 1440.

The network interface 1435 sends vectors stored in the blocks of the main storage device 1410 to the network 1450 and receives vectors from the network 1450 to the merging device 1430 under the control of the controlling device 1440.

The merging device 1430 merges a vector of a block of the main storage device received through the switch box 1420 with a vector received from the network 1450 through the network interface 1435. The merged vector is stored in a block of the main storage device 1410 through the switch box 1420. In other words, the merging device 1430 divides the merged vector into two vectors (a larger vector and a smaller vector) and stores them in two blocks of the main storage device 1410.

The controlling device 1440 selects both a processing device number as a substituting partner and a substituting method (a smaller vector or a larger vector) corresponding to the two equations which were described above with respect to the operation of the invention shown in FIG. 8. The controlling device 1440 controls the network interface 1435 so as to send a vector to be substituted to the other processing device as a substituting partner. In addition, the controlling device 1440 controls the switch box 1420 so as to connect a block which stores a vector to be sent to the network interface 1435.

$$A(i, j, k) = 2^k \oplus i \quad (6)$$

$$B(i, j, k) = i_{j+1} \oplus i_j \oplus i_k \quad (7)$$

where i is a processing device number; j is a stage number; k is a sub stage number; and $i_j$ is $b_j$ which is the binary notation of i ($b_{n-1}, b_{n-2}, \ldots, b_j, \ldots b_1, b_0$).

Figure 19:
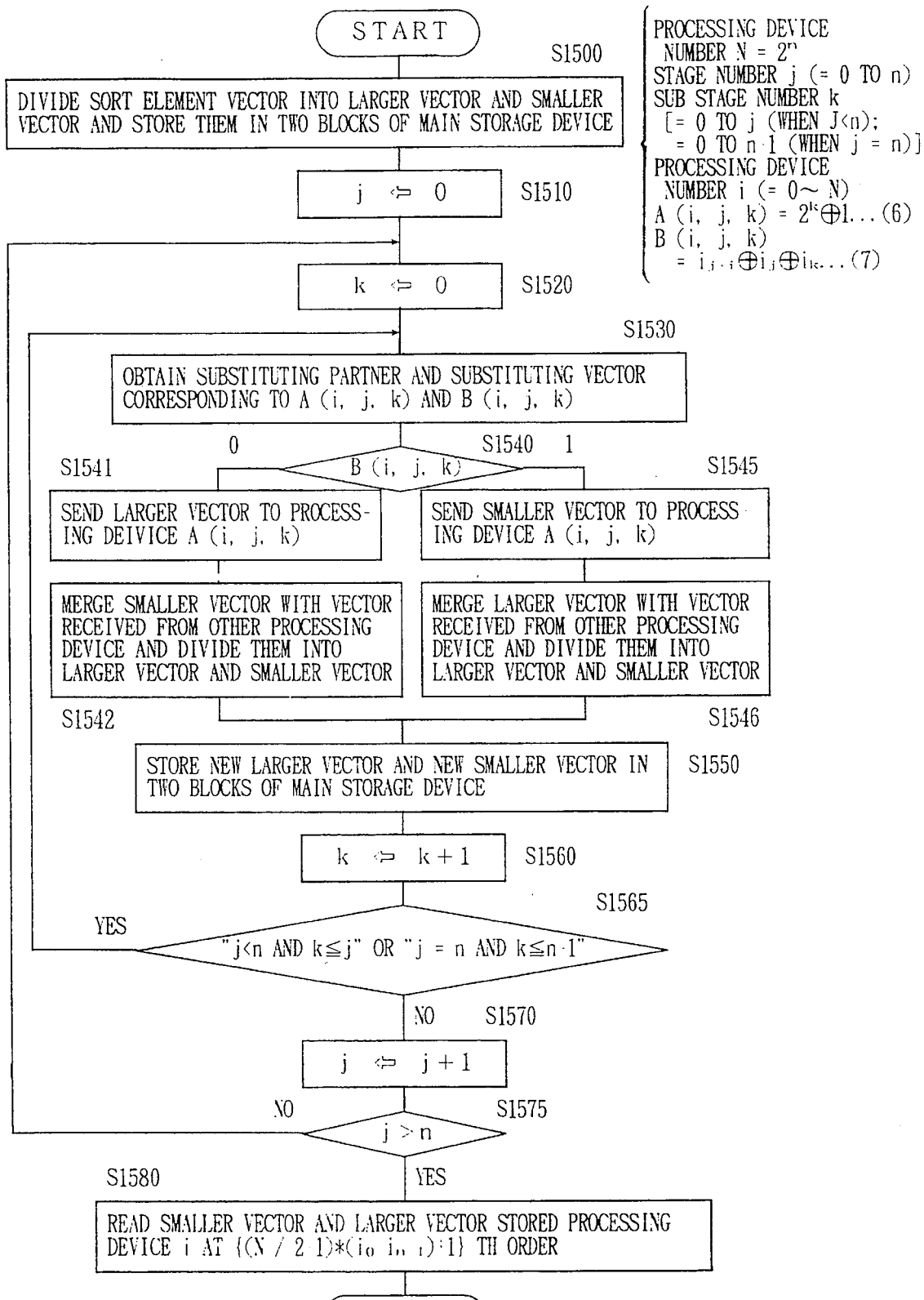
FIG. 19 is a flow chart showing the operation according to the seventh embodiment of the present invention.

FIG. 19 is a flow chart showing the operation of the invention in accordance with the seventh embodiment.

First, all element vectors are divided into N which is the number of the processing devices. In each processing device, the divided vectors are sorted. The smaller vector and the larger vector are stored in two blocks ($M_0$ and $M_1$ of the main storage device of the processing device (S1500). After the vectors have been stored, the process sequence is started.

The sorting process is performed for (n+1) stages. Each stage is denoted by j (=0 to n). The stage j (where j<n) consists of (j+1) sub stages. Each sub stage is denoted by k (=0 to j). The last stage (j=n) consists of n sub stages (k=0 to n−1). The number of sub stages in the last stage is one less than that of other stages.

The process sequence is started from the sub stage 0 of the stage 0 (S1510 and S1520). By the equation (6), a processing device number with which a vector is substituted is obtained. By the equation (7), a vector to be substituted is obtained (S1530). This process sequence is performed by the controlling device 1440. Corresponding to the value of the equation (7), the controlling unit 1440 controls the switch box 1420 so as to connect blocks of the main storage device 1410, the switch box 1420, and the network interface 1440. in addition, corresponding to the value of the equation (6), the controlling unit 1440 controls the network interface 1440 so as to send a vector to be substituted to the other processing device as a substituting partner (SI541 and S1545). At this point, corresponding to the value (0 or 1) of B (i, j, k) of the equation (7), the controlling unit 1440 selects either the larger vector or the smaller vector stored in the blocks of the main storage device 1410 and sends the selected vector.

When the larger vector is sent to the processing device A (i, j, k) (S1540 and S1541), the controlling device 1440 controls the switch box 1420 so as to connect the smaller vector which has not been sent to the input 0 of the merging device 1430 and the vector received from the other processing device to the input 1 of the merging device 1430. Thus, the two vectors are merged. Thereafter, the merged vector is divided into two vectors (a larger vector and smaller vector) (S1542) and these vectors are stored in two blocks of the main storage device (S1550).

On the other hand, when the smaller vector is sent to the processing device A (i, j, k) (S1540 and S1545), the controlling device 1440 controls the switch box 1420 so as to connect the larger vector which has not been sent to the input 0 of the merging device 1430 and the vector received from the other processing device to the input 1 of the merging device 1430. Thus, the two vectors are merged. Thereafter, the merging device 1430 divides the merged vector into two vectors (a larger vector and a smaller, vector) (S1546) and then stores these vectors in two blacks of the main storage device (S1550).

Thus, the process sequence for one sub stage is completed. Thereafter, the sub stage number k is incremented by one (S1560). When there is a sub stage to be processed (namely, the determined result at S1565 is YES), the flow returns back to S1530. At S1530, the substituting and merging process is performed. When the process sequence f or all the sub stages of the present stage has been completed (the determined result at S1565 is NO), the stage number j is incremented by one so as to perform the process sequence for the next stage (S1570). When the stage number is n or less (determined result at S1575 is NO), the flow returns back to S1520. At this step the sub stage number k is reset to 0. In addition, the process sequence for the first sub stage is performed. On the other hand, when the stage number becomes more than n, the sorting process is completed (determined result at S1575 is YES). At this point, since the sorted results are not stored in the order of the processing device numbers, the larger and smaller vectors stored in the processing device 1 are read at the ((N/2−1)*($i_0-i_{n-1}$)+1)-th order (S1580). Thus, the sorted results can be obtained.

The substituting, merging, and storing processes for vectors may be pipelined.

Figure 20:
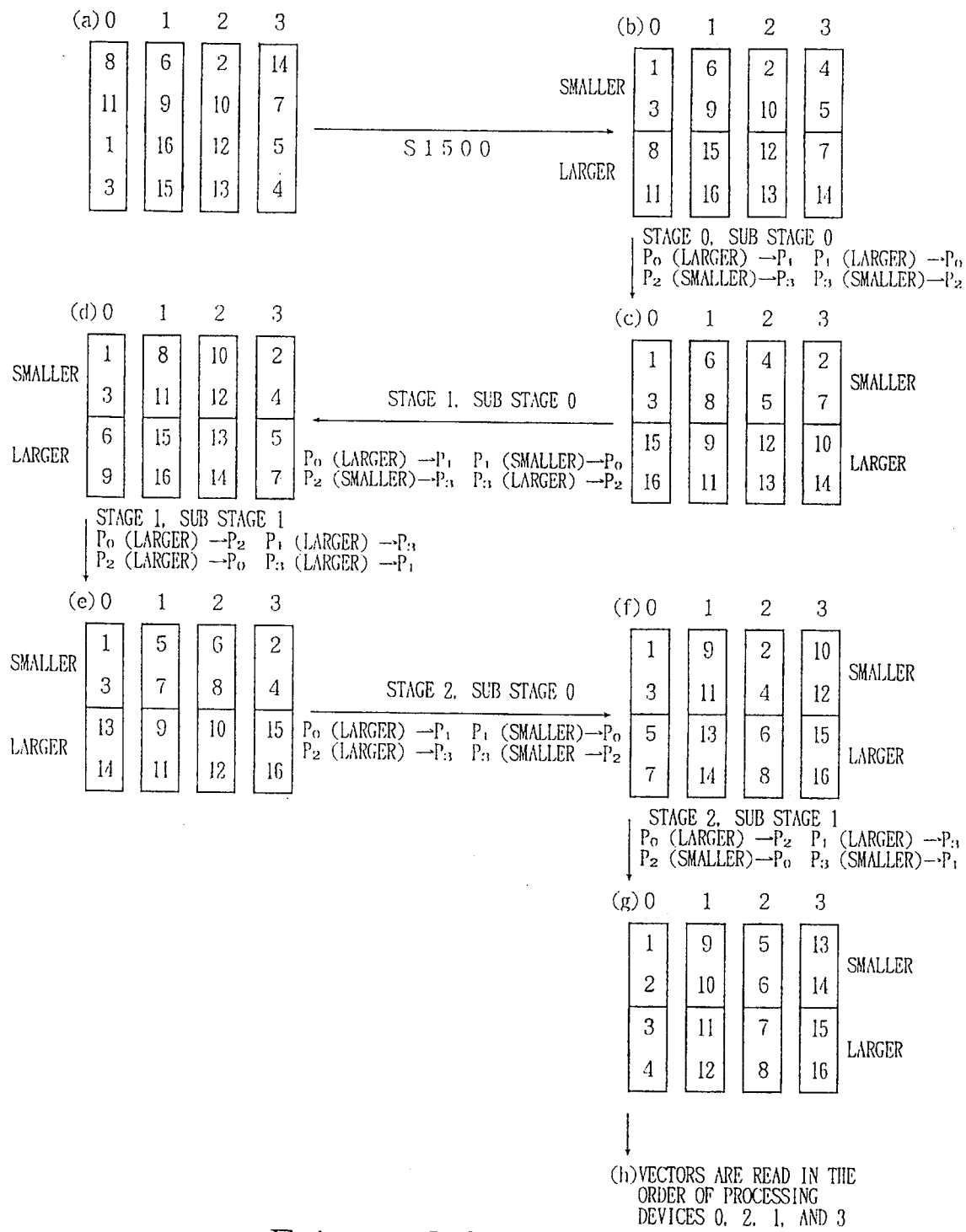
FIG. 20 is a schematic diagram showing an example of a sorting process performed by four processing devices according to the seventh embodiment of the present invention.

FIG. 20 is a schematic diagram showing an example of sorting process in accordance with the seventh embodiment of the invention which is performed with respect to the principles set forth above in the description of FIG. 8. In FIG. 20, sixteen (16) numeric values are sorted by four processing devices. In this example, the same numeric values are used as those of the sorting process according to the first embodiment shown in FIG. 13. In other words, (8, 11, 1, 3), (6, 91 16, 15), (2, 10, 12, 13), and (14, 7, 5, 4) are stored in the processing devices 0, 1, 2, and 3, respectively (see (a) in FIG. 20). At step S1500, a vector stored in each processing device is divided into a larger vector and a smaller vector and then stored therein (see (b) in FIG. 20).

Next, the process sequence is started from the sub stage 0 of the stage 0. In this sub stage, the larger vector of the processing device 0 is sent to the processing device 1. The larger vector of the processing device 1 is sent to the processing device 0. The smaller vector at the processing device 2 is sent to the processing device 3. The smaller vector of the processing device 3 is sent to the processing device 2. In each processing device, the merging process is performed and the merged result is stored (S1530 and S1550). Thus, the result as shown in (c) in FIG. 20 is obtained.

In the sub stage 0 of the stage 1, the larger vector of the processing device 0 is sent to the processing device 1. The smaller vector of the processing device 1 is sent to the processing device 0. The smaller vector of the processing device 2 is sent to the processing device 3. The larger vector of the processing device 3 is sent to the processing device 2. Thereafter, in each processing device the merging process is performed. The merged vector is stored in each processing device (see (d) in FIG. 20). Thereafter, the process sequences for the sub stage 1 of the stage 1, the sub stage 0 of the stage 2, and the sub stage 1 of the stage 2 are successively performed. Thus, the processing devices store the vectors as shown in (g) in FIG. 20.

When the vectors stored in the processing devices are read in the order given at S1580 (see (h) in FIG. 20), the sorted vectors are obtained.

Each processing device which is operated according to the principles described with respect to FIG. 8 can be constructed of the processing device of the general-purpose loosely connected parallel computer according to the third embodiment of the present invention shown in of FIG. 14.

In this case, the main storage device 1010 stored a larger vector, a smaller vector, and their merged results (a new larger vector had a new smaller vector). In addition, the main storage device 1010 stores a program which controls the CPU 1020 which performs the sorting process. Corresponding to the program, the CPU controls the network interface 1030 so as to appropriately substitute vectors. The network 1040 substitute a vector with that stored in another appropriate processing device under the control of a controlling means of the network 1040. The CPU merges the vector received from the network with a vector which has not be substituted. In addition, the CPU divides the merged vector into a larger vector and a smaller vector and then stores them in the main storage device 1010. The substituting, merging, and storing processes for vectors are pipelines.

Although the present invention has been shown and described with respect to a best mode embodiment thereof, it should be understood by those skilled in the art that the foregoing various other changes, omissions, and additions in the form and detail thereof may be made therein without departing from the spirit and scope of the present invention.

What is claimed is:

1. A parallel sorting system for sorting sort elements including a plurality of processing devices connected in a network, each processing device comprising:

sort element storing means for storing a portion of said sort elements to be sorted, wherein the sort elements are represented in a matrix with each processing device represented as one of a row and a column of the matrix;

inner sorting means for sorting sort elements stored in said sort element storing means in one of a larger-to-smaller order and a smaller-to-larger order and storing the sorted elements in said sort element storing means;

transposing means for transposing the matrix representing the sort elements by exchanging sort elements stored in said sort element storing means with sort elements received through said network from other processing devices, wherein the sort elements stored in the sort element storing means are exchanged with the sort elements received through said network at transposed positions in said matrix representing the sort elements and stored at the corresponding transposed position in said matrix; and comparing and substituting means for comparing a first sort element and a second sort element stored in said sort element storing means and substituting the first sort element and the second sort element with each other to change the order of the first and second sort elements.

2. The parallel sorting system according to claim 1, wherein each of the operations performed by said inner sorting means, transposing means, and comparing and substituting means are performed a plurality of times.

3. The parallel sorting system according to claim 1, comprising N processing devices, and wherein a number of sort elements is D and each processing device stores D/N sort elements.

4. The parallel sorting system according to claim 1, wherein said one of the larger-to-smaller and the smaller-to-larger order is determined according to bits in a binary representation indicating the number N of said processing devices.

5. The parallel sorting system according to claim 1, wherein said comparing and substituting means compares a sort element of a first processing device with a corresponding sort element of a second processing device, and exchanges the sort elements between the first and second processing devices.

6. The parallel sorting system according to claim 5, wherein said comparing and substituting means operates said inner sorting means to compare two sort elements and substitutes the first sort element and the second sort element for each other.

7. The parallel sorting system according to claim 1, wherein the number of sort elements is D and said sort element storing means divides the D sort elements into N blocks of sort elements, where N is the number of processing devices, and stores the N blocks of sort elements as vectors;

said inner sorting means sorts the sort elements stored as vectors in one of a larger-to-smaller order and a smaller-to-larger order and stores the sorted elements in said sort element storing means;

said transposing means exchanges the sort elements stored in said sort element storing means with those provided by the other processing device through said network, and stores the sort elements received from the other processing device at the transposing position; and said comparing and substituting means compares the first and the second sort element vectors stored in said sort element storing means, and substitutes the first vector for the second vector thereby to change the order of the first and second vectors.

8. The parallel sorting system according to claim 1, wherein each of said plurality processing devices is designed as a general purpose computer system comprising a central processing unit, a main storage, and an interface to said network, said computer system being connected through said network in a loosely-connected parallel computer configuration.

9. The parallel sorting system according to claim 1, wherein said network and said processing devices are loosely connected in a multiple network.

10. The parallel sorting system according to claim 1, wherein said network and said processing devices are connected in a hyper cube network.

11. The parallel sorting system according to claim 1, wherein said network and said processing devices are connected in a torus network.

12. A method of performing a parallel sorting using a plurality of processing devices connected to a network, comprising the steps of:

storing sort elements to be sorted in storing means in one of the processing devices, wherein the sort elements are represented in a matrix with each processing device representing one of a row and a column in the matrix;

sorting the sort elements stored in the storing means in one of a larger-to-smaller order and a smaller-to-larger order, in said one of the processing devices;

transposing the matrix representing the sort elements by exchanging stored sort elements stored in the storing means represented at positions in the matrix with stored sort elements received from a processing device through said network and represented at corresponding transposed positions in the matrix, in said one of the processing devices;

storing the sort elements received from the processing device at the transposed position in said matrix in said one of the processing devices;

comparing a first sort element and a second sort element stored in said sort element storing step, in said one of the processing devices; and substituting the order of the first and second sort elements in said one of the processing devices.

13. The parallel sorting method according to claim 12, further comprising the step of:

repeatedly performing each of the processes performed in said sorting step, said exchanging step, said comparing step, and said substituting step.

14. The parallel sorting method according to claim 12, wherein said sort element storing step comprises, dividing a number of sort elements into N blocks;

storing the N blocks of sort elements as vectors;

said sorting step comprises, sorting the sort elements stored as vectors in one of a larger-to-smaller order and a smaller-to-larger order, and storing the sorted sort elements;

said exchanging step comprises, exchanging the stored sort elements with those received from the other processing device through said network at a transposed position in said matrix, and storing the sort elements received from the other processing device at the transposing position;

said comparing step comprises, comparing the two sort element vectors stored in said sort element storing step; and said substituting step comprises, substituting the order of the vectors.

* * * * *

UNITED STATES PATENT AND TRADEMARK OFFICE
CERTIFICATE OF CORRECTION

PATENT NO. : 5,621,908
DATED : April 15, 1997
INVENTOR(S) : Naoki AKABOSHI, et al.

It is certified that error appears in the above-indentified patent and that said Letters Patent is hereby corrected as shown below:

<u>TITLE PAGE [56] OTHER PUBLICATIONS</u>

Second occurrence of "Bitonic sort on a mesh-connected parallel computer, by Sahni et al. IEEE Jan. 1979, pp. (2-7)." should be deleted.

<u>TITLE PAGE [57] ABSTRACT</u>

Line 1, "$N(=2^n)$" should be --$N(-2^n)$--.

<u>Column 19</u>

Line 52, "$(M_0$ and $M_1$" should be --$(M_0$ and $M_1)$--.

<u>Column 23</u>

Line 29, "position" should be --positions--.

Signed and Sealed this

Fifth Day of August, 1997

Attest:

BRUCE LEHMAN

*Attesting Officer*     *Commissioner of Patents and Trademarks*